US008732190B2

(12) United States Patent
Fotta et al.

(10) Patent No.: US 8,732,190 B2
(45) Date of Patent: *May 20, 2014

(54) NETWORK CALLING PRIVACY WITH RECORDING

(75) Inventors: Keith A. Fotta, Duxbury, MA (US); Richard P. Boudrieau, Duxbury, MA (US); Robert E. Ziemba, Jr., Glen Gardner, NJ (US); Norman M. D'Amours, Falls Church, VA (US)

(73) Assignee: Gryphon Networks Corp., Norwood, MA (US)

( * ) Notice: Subject to any disclaimer, the term of this patent is extended or adjusted under 35 U.S.C. 154(b) by 107 days.

This patent is subject to a terminal disclaimer.

(21) Appl. No.: 12/957,132

(22) Filed: Nov. 30, 2010

(65) Prior Publication Data

US 2012/0059860 A1    Mar. 8, 2012

Related U.S. Application Data

(63) Continuation-in-part of application No. 12/874,864, filed on Sep. 2, 2010.

(51) Int. Cl.
  *G06F 17/30* (2006.01)
(52) U.S. Cl.
  CPC .................. *G06F 17/30017* (2013.01)
  USPC ........................................................ 707/769
(58) Field of Classification Search
  USPC ......... 707/694, 769, 770, 781, 782, 783, 784; 726/2, 4, 26, 27; 379/188, 200, 201.02, 379/212.01
  See application file for complete search history.

(56) References Cited

U.S. PATENT DOCUMENTS

| | | | |
|---|---|---|---|
| 5,960,073 A | 9/1999 | Kikinis et al. | |
| 5,999,932 A | 12/1999 | Paul | |
| 6,049,782 A | 4/2000 | Gottesman et al. | |
| 6,052,709 A | 4/2000 | Paul | |
| 6,081,591 A | 6/2000 | Skoog | |
| 6,081,592 A | 6/2000 | Battle | |
| 6,092,099 A | 7/2000 | Irie et al. | |
| 6,130,937 A * | 10/2000 | Fotta ............................ | 379/200 |
| 6,249,575 B1 | 6/2001 | Heilmann et al. | |
| 6,275,824 B1 * | 8/2001 | O'Flaherty et al. ................... | 1/1 |

(Continued)

FOREIGN PATENT DOCUMENTS

| | | |
|---|---|---|
| EP | 0 946 022 A2 | 9/1999 |
| WO | WO 98/51062 A1 | 11/1998 |

(Continued)

OTHER PUBLICATIONS

Andrew D. Birrell., Secure communication using remote procedure calls, Feb. 1985, ACM, 1-14.*

(Continued)

*Primary Examiner* — Jean B Fleurantin
(74) *Attorney, Agent, or Firm* — Hamilton, Brook, Smith & Reynolds, P.C.

(57) ABSTRACT

Compliance with a privacy database and call-specific applications is provided within a network. A service control function (SCF), in communication with a privacy database, selectively establishes a call between an origin and a destination. Based on origin or destination identifiers, call parameters are determined for further operations associated with the call. A server, responsive to the call parameters, performs monitoring of the call or post-call disposition to update the privacy database.

20 Claims, 13 Drawing Sheets

(56) References Cited

U.S. PATENT DOCUMENTS

| | | | |
|---|---|---|---|
| 6,321,267 B1 | 11/2001 | Donaldson | |
| 6,330,317 B1 | 12/2001 | Garfinkel | |
| 6,480,850 B1* | 11/2002 | Veldhuisen | 707/610 |
| 6,493,007 B1 | 12/2002 | Pang | |
| 6,643,686 B1 | 11/2003 | Hall | |
| 6,788,773 B1* | 9/2004 | Fotta | 379/200 |
| 6,853,717 B1 | 2/2005 | Frentz et al. | |
| 7,020,259 B2 | 3/2006 | Hussain et al. | |
| 7,023,980 B2 | 4/2006 | Lenard | |
| 7,099,444 B1 | 8/2006 | Russell | |
| 7,158,630 B2 | 1/2007 | Fotta et al. | |
| 7,162,474 B1 | 1/2007 | Harker et al. | |
| 7,194,075 B2 | 3/2007 | Fotta | |
| 7,212,620 B1 | 5/2007 | Mastro | |
| 7,215,760 B2 | 5/2007 | Lenard | |
| 7,227,930 B1 | 6/2007 | Othmer et al. | |
| 7,231,029 B1 | 6/2007 | Kirkpatrick | |
| 7,333,798 B2 | 2/2008 | Hodge | |
| 7,412,049 B1 | 8/2008 | Koch | |
| 7,461,263 B2 | 12/2008 | Prince | |
| 7,474,741 B2 | 1/2009 | Brunson et al. | |
| 7,536,437 B2 | 5/2009 | Zmolek | |
| 7,552,058 B1 | 6/2009 | Zhang | |
| 7,574,471 B2 | 8/2009 | Fotta et al. | |
| 8,126,857 B2* | 2/2012 | Maitino et al. | 707/694 |
| 8,572,113 B2 | 10/2013 | Fotta et al. | |
| 2002/0075303 A1 | 6/2002 | Thompson et al. | |
| 2002/0152272 A1 | 10/2002 | Yairi | |
| 2002/0169954 A1 | 11/2002 | Bandini et al. | |
| 2003/0041126 A1 | 2/2003 | Buford et al. | |
| 2003/0074286 A1 | 4/2003 | Rodrigo | |
| 2003/0074397 A1 | 4/2003 | Morin et al. | |
| 2003/0093320 A1 | 5/2003 | Sullivan | |
| 2003/0126218 A1 | 7/2003 | Sakonsaku | |
| 2003/0132972 A1 | 7/2003 | Pang | |
| 2003/0135737 A1 | 7/2003 | Bouthors | |
| 2003/0212566 A1 | 11/2003 | Fergusson et al. | |
| 2003/0217079 A1 | 11/2003 | Bakalash et al. | |
| 2004/0066926 A1 | 4/2004 | Brockbank et al. | |
| 2004/0109557 A1 | 6/2004 | Lenard | |
| 2004/0114747 A1 | 6/2004 | Trandal et al. | |
| 2004/0148506 A1 | 7/2004 | Prince | |
| 2005/0031107 A1 | 2/2005 | Fotta | |
| 2005/0074114 A1* | 4/2005 | Fotta et al. | 379/266.08 |
| 2005/0144279 A1 | 6/2005 | Wexelblat | |
| 2005/0226151 A1 | 10/2005 | Fotta et al. | |
| 2005/0226221 A1 | 10/2005 | Fotta et al. | |
| 2005/0249209 A1 | 11/2005 | Fotta et al. | |
| 2006/0045070 A1 | 3/2006 | Fotta | |
| 2006/0159060 A1 | 7/2006 | Fotta et al. | |
| 2006/0188075 A1* | 8/2006 | Peterson | 379/67.1 |
| 2007/0136789 A1 | 6/2007 | Fotta | |
| 2012/0059841 A1* | 3/2012 | Fotta et al. | 707/769 |

FOREIGN PATENT DOCUMENTS

| | | |
|---|---|---|
| WO | WO 03/054764 A1 | 7/2003 |
| WO | WO 03/107644 A1 | 12/2003 |
| WO | WO 2004/006551 A1 | 1/2004 |
| WO | WO 2006/115909 A1 | 11/2006 |
| WO | WO 2006/133337 A2 | 12/2006 |
| WO | WO 2007/041436 | 4/2007 |

OTHER PUBLICATIONS

International Search Report and Written Opinion for International Appl. No. PCT/US2011/049995; Mailed: Mar. 2, 2012.

Myers, J., "Network Working Group, Request for Comments," 2222:1-16 (Oct. 1997); http://www.ietf.org/rfc/rfc222.txt, Nov. 11, 2003.

Myers, J., "Network Working Group, Request for Comments," 2554:1-11 (Mar. 1999).

Franks, J., et al., "Network Working Group, Request for Comments," 2617:1-34 (Jun. 1999) http://www.ictf.org/rfc/rfc2617.txt?number=2617, Nov. 11, 2003.

International Search Report from International Application No. PCT/US2006/014584, dated Jul. 27, 2006.

International Search Report from International Application No. PCT/US2006/038322, dated Jan. 22, 2007.

International Search Report from International Application No. PCT/US05/31435 dated Feb. 24, 2006.

Office Action dated Mar. 21, 2008, issued in U.S. Appl. No. 11/111,494.

Office Action dated Apr. 21, 2008, issued in U.S. Appl. No. 10/820,452.

Office Action dated Jul. 20, 2009, issued in U.S. Appl. No. 11/111,494.

Office Action dated Dec. 28, 2009, issued in U.S. Appl. No. 11/242,614.

Office Action dated Nov. 13, 2009, issued in U.S. Appl. No. 10/820,452.

Managing inbound spam in Lotus Domino 6, presented by Lotus Developer Domain, pp. 1-28.

InboxMaster™ brochure, from Secluda Technologies, Inc.™ (11 pp) (2003).

"Do Not Call", presented by Mutual of Omaha, pp. 1-4 (2004).

"Do-Not-Call Compliance", presented by VeriSign, pp. 1-7 (2004).

Office Action, Mail Date Jan. 27, 2009, U.S. Appl. No. 10/820,452.

Office Action, Mail Date Jan. 9, 2009, U.S. Appl. No. 11/111,494.

Office Action, Mail Date Jun. 23, 2009, U.S. Appl. No. 11/302,958.

Office Action dated Feb. 4, 2009 issued in U.S. Appl. No. 11/021,564.

Office Action dated Oct. 7, 2010, issued in U.S. Appl. No. 10/820,452.

Office Action dated Oct. 15, 2010, U.S. Appl. No. 11/021,564.

Office Action dated Aug. 3, 2010, issued in U.S. Appl. No. 11/111,494.

Office Action dated Aug. 13, 2010, issued in U.S. Appl. No. 11/242,614.

International Preliminary Report on Patentability, International Appl. No. PCT/US2006/014584, issued Oct. 23, 2007.

International Preliminary Report on Patentability, International Appl. No. PCT/US2006/038322, mailed Apr. 17, 2008.

Communication pursuant to Article 94(3) EPC, dated Dec. 3, 2009, EP 06 750 590.9.

Office Action dated Oct. 27, 2009, U.S. Appl. No. 11/021,564.

Office Action dated Apr. 26, 2010, U.S. Appl. No. 11/021,564.

Office Action dated Mar. 11, 2010, U.S. Appl. No. 11/111,494.

Office Action dated Apr. 12, 2010, U.S. Appl. No. 10/820,452.

Office Action mail date Jun. 25, 2009, U.S. Appl. No. 11/242,614.

Office Action mail date May 17, 2012, U.S. Appl. No. 12/874,864.

Office Communication mail date Oct. 9, 2012, U.S. Appl. No. 12/874,864.

Notification of Transmittal of the International Preliminary Report on Patentability for PCT/US2011/049995, "Network Calling Privacy With Recording," mailed Mar. 14, 2013.

Final Office Action mail date Jan. 4, 2013, U.S. Appl. No. 12/874,864.

Notice of Allowance, dated Jun. 26, 2013, U.S. Appl. No. 12/874,864.

"Do-Not-Call Compliance," *VeriSign Communications Services*, pp. 2-7, (2004).

* cited by examiner

NETWORK CALLING PRIVACY WITH RECORDING

RELATED APPLICATIONS

This Application is a Continuation-in-Part of U.S. application Ser. No. 12/874,864, filed on Sep. 2, 2010, the entirety of which is incorporated herein by reference.

BACKGROUND

Privacy laws that restrict the ability to make and record telephonic and other communications exist in the United States, as well as other countries, and vary significantly from jurisdiction to jurisdiction.

Certain Do Not Call marketing privacy laws referenced in U.S. Pat. Nos. 6,130,937, 6,788,773, 7,158,630, 7,194,075 and 7,574,471 require marketers to restrict, enable, manage and otherwise apply specific treatment and business processes to marketing communications based on the jurisdiction associated with the party they are communicating with.

These Do Not Call privacy laws dictate, among other things, which communications may be made, the time of day communications may be made, disclosures that must be delivered during communications, data that must be captured during communications, and minimum periods such captured data must be preserved.

Other marketing privacy regulations, including the U.S. Federal Trade Commission's (FTC) Telemarketing Sales Rule, require businesses to audio-record a consumer's telephonic authorization to enter into a transaction, such as a charge or recurring charge to a credit card or other account.

Certain regulatory authorities, including the Financial Industry Regulatory Authority (FINRA) in the United States and Financial Services Authority (FSA) in the United Kingdom, require audio-recording or "taping" of communications related to client orders, negotiations and transactions in the equity, bond and derivatives markets.

Similar statutes and regulations apply to other industries, such as the U.S. Federal Communications Commission's (FCC) "anti-slamming" rules that require telecommunications carriers to obtain and preserve audio verification of orders for telecommunications service for a minimum of two (2) years after obtaining verification.

Certain other consumer privacy laws, including the U.S. federal Telecommunications Act, require the consent of at least one party to a communication in order to allow recording or monitoring of the communication, while other more restrictive U.S. state laws, including California and Connecticut law, only permit monitoring or recording when all parties to the communication have provided consent. Disclosure that a call is or will be recorded or monitored is necessary for consent.

Disclosures of specific information are also required under many other consumer protection laws, including the FTC's Telemarketing Sales Rule, which requires businesses to clearly provide certain information before marketing to a consumer (ex. identify of seller, purpose of the call) or before a consumer pays for goods or services (ex. material restrictions, limitations or terms such as refund policy, negative option features, or number of debits, charges, or payments).

Certain businesses that are not required by law to record or monitor communications voluntarily do so for quality assurance and training purposes, and are thereby subject to privacy laws requiring disclosures and consent from one or more parties to the communication. Businesses required by law to audio-record or tape communications must also comply with these consent and disclosure requirements that vary from jurisdiction to jurisdiction.

Similar privacy laws and industry requirements exist and have been proposed in other jurisdictions, including Australia, Canada and European Union countries, and vary from jurisdiction to jurisdiction.

Similar to Do Not Call privacy laws, businesses using the telephone to contact consumers must restrict, enable, manage and otherwise apply specific treatment and business processes to marketing communications based on the jurisdiction associated with the party they are communicating with and/or the jurisdiction associated with the calls origin.

Preserving the ability to conduct business using the telephone while avoiding fines, criminal penalties and brand damage associated with violating these privacy and consumer protection laws and requirements is a critical and challenging issue for businesses.

SUMMARY

Example embodiments of the present invention provide a system for managing communications in a network. A caller may employ a service provided by example embodiments when initiating an outbound or receiving an inbound communication between an origin (e.g., a "land line" telephone, mobile telephone, or Voice over IP (VoIP) terminal) and a destination.

Example embodiments of the invention may include a Privacy database configured to store call recording rules associated with a plurality of origins and destinations. A service control function (SCF) is configured to selectively establish a call between an origin and a destination based on the status and jurisdiction of the origin and destination indicated in the Privacy database. The SCF is further configured to provide parameters for the call based on the call recording rules. The parameters can include, for example, parameters specifying whether a call may be recorded, whether a disclosure should be delivered, or to record only one of the parties to the call. A server is configured, responsive to the parameters, to selectively record the call, deliver certain disclosures, and report an input to update the Privacy database.

Disclosures (also referred to as "notifications") include information conveyed to one or more parties to a call at the origin and/or destination that a business desires or is required by privacy or consumer protection laws to deliver, including information relating to marketing, call recording, Do Not Call (DNC), legal exemptions, preferences, material terms, payment, or status or jurisdiction of the origin or destination indicated in the Privacy database or a separate storage database. Such disclosures may be delivered before, during or after a call, or may be delivered absent a call if the call is prohibited by a parameter indicated by the Privacy database.

A Privacy database may also include a Call Recording Rules engine with processes and information based on jurisdictions associated with the destination and/or origin of a telephonic communication. This Call Recording Rules engine determines processes to apply to each individual communication based on the communications destination and/or origin jurisdiction, including enabling or prohibiting the communication, enabling or prohibiting recording or other means of capturing the communication, triggering pre- and post-connection electronic notifications or disclosures to one or both parties to the communication, triggering recording or capture of only one or both parties' verbal communication, or enabling the capture (via key press, mouse click or otherwise) or recording of consent, authorization and/or an electronic signature from the called party inbound call (automatically or as initiated by the calling party key press, mouse click or otherwise) to consent to call recording, authorize a transaction(s) and/or create an legal exemption (ex. express consent or written permission) to privacy restrictions, including DNC laws, prerecorded or automated voice message regulations and/or automated dialing equipment regulations, and transmission or associated updates to the Privacy database or a separate storage database.

A Privacy database may also include a Do Not Call Rules engine with processes and information based on jurisdictions associated with the destination of a telephonic communication. This Do Not Call Rules engine determines processes to apply to each individual communication including checking the federal Do Not Call list, appropriate state Do Not Call lists based on jurisdiction, appropriate internal Do Not Call lists as well as any valid exemptions (including but not limited to existing business relationships) that would permit or disallow the call to be completed.

Rules engines within the Privacy database such as the DNC Rules Engine and Recording rules engine may interact with and update each other and storage databases within and outside of the Privacy database to capture and apply parameters to calls. One iteration of this interaction and updating is the capture of a legal exemption to a Do Not Call regulation via a recorded call to update a storage database such that the DNC rules engine applies the exemption to override the Do Not Call regulation during a future communication.

A Privacy database may also include a Data Repository which stores information collected during before, during and/or after a telephone call. The Data Repository allows analysis of the call information at a later time which may result in updates to the Call Recording Rules engine and/or the Do Not Call Rules engine and/or other databases such as $3^{rd}$ party Customer Relationship Management (CRM) databases.

A Call Session Control Function (CSCF) operates within an IP Multimedia Subsystem (IMS) network to determine how a communication is to be routed. The CSCF, in conjunction with a Home Subscriber Server (HSS), and in communication with the Privacy database, is configured to selectively establish or prevent, (as well as provide disclosures before or during) a call between an origin and a destination based on the status and jurisdiction of the origin and/or destination as indicated in the Privacy database. The CSCF is further configured to respond to parameters for the call which may indicate further call processing based on destination status and/or a subscriber status of the origin and/or destination, all of which is based on information provided in the Privacy database.

The CSCF also directs the Media Resource Function (MRF), also referred to as the media server, to interact with the origin and/or destination caller. These interactions include recording calls, delivering disclosures and/or listening to and responding to instructions (via key press, mouse click or other action) during or after a call. The media server is configured, responsive to the call parameters, to conduct further processing of the call. For example, the media server may produce a record of the call, such as an audio recording of the call, based on the originating and/or terminating jurisdiction, that is then stored in the Privacy database. The media server may report a code entered following establishment of the call that will also update the Privacy database.

In further embodiments, the CSCF may be configured to consult and interact with additional rules engines and storage databases within the Privacy database and/or other databases such as $3^{rd}$ party Customer Relationship Management (CRM) databases to determine the parameters and treatment to selectively apply to each call based on jurisdiction and/or client or other lists a phone number appears on, such as a DNC list or DNC exemption list.

In still further embodiments, the CSCF may be configured to compare the jurisdiction associated with an origin or destination ID against the Privacy database, the comparison being used to update the call parameters. For example, the jurisdiction status of the origin or destination may be employed by the CSCF to selectively produce a recording of the call, deliver disclosures before or during the call, and may provide for preventing establishment of the call.

In still further embodiments, the media server may be instructed by the CSCF to monitor codes pressed before, during and/or following termination of the call. Upon receiving a code entered at the origin or destination, before, during and/or following termination of the call, the media server updates the Privacy database based on the code entered.

In still further embodiments, the CSCF may be configured further to instruct the media server to deliver notifications or disclosures to relay certain information to the origin and/or destination or indicate whether certain parameters apply to the call or the call is prohibited based on the status indicated in the Privacy database.

In still further embodiments, the server may be configured, responsive to the call parameters provided by the Privacy database, to report a code entered at the destination following establishment of the call, the code being used (e.g., by the CSCF) to update the Privacy database. The Privacy database may be configured further to include an indication of legal authorizations or communications preferences for a user associated with the origin or destination.

In still further embodiments, the media server may be integrated as a component of the CSCF.

In still further embodiments, the Privacy database may be comprised of multiple physical databases that may reside on separate physical devices and in geographically separate locations.

In still further embodiments, the media server may be configured to convey an "intervening number," associated with the media server, to a destination during an outbound call. In subsequent inbound calls, a caller at the destination may initiate a call to the origin by dialing the intervening number, thereby establishing a call through the media server to enable call recording and call disposition.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
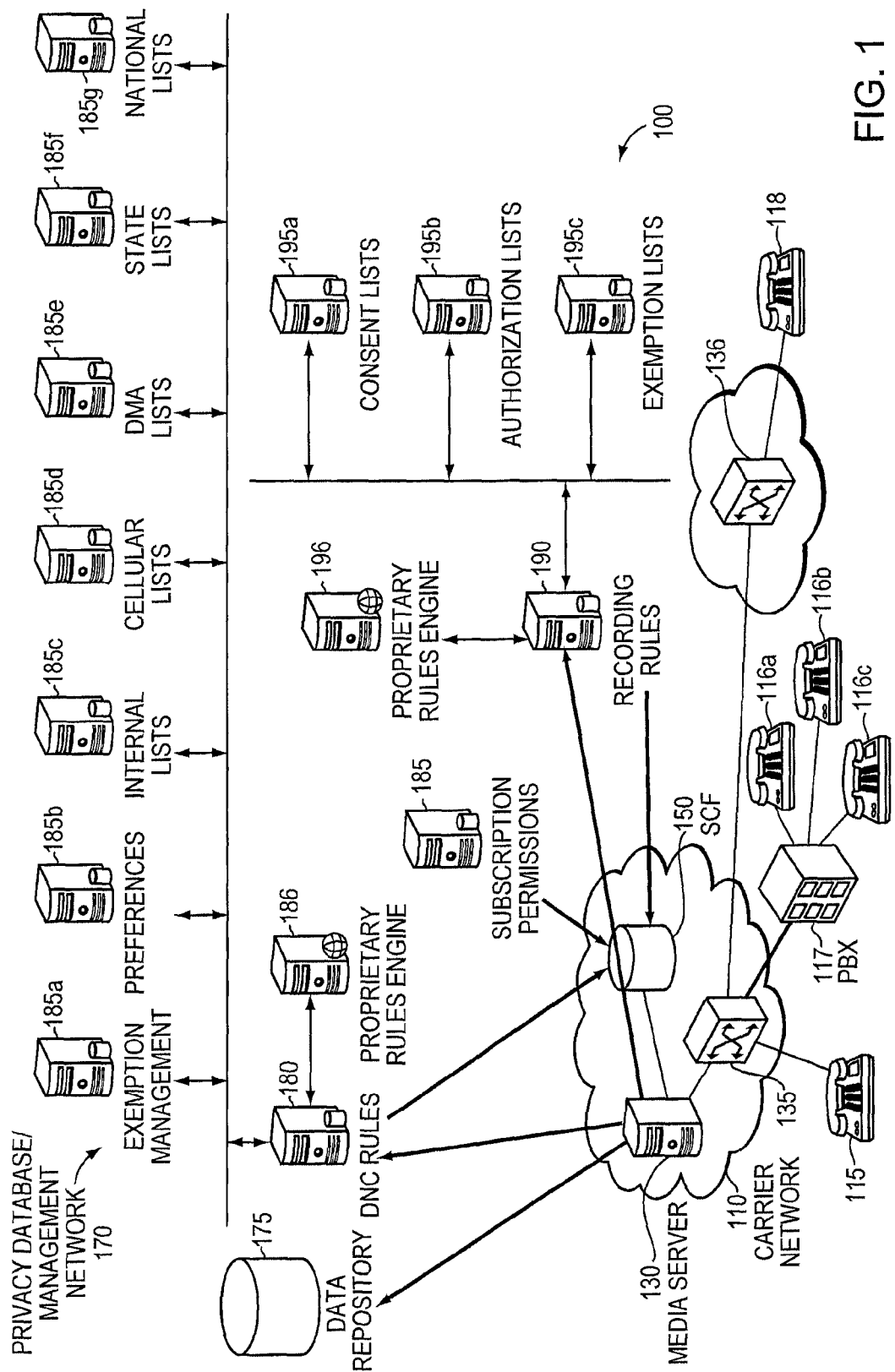
FIG. 1 is block diagram of a network architecture encompassing a system for managing communications.

FIG. 1 illustrates an example communications network 100 implementing a system for managing communications according to an embodiment of the invention. The network 100 generally includes a carrier network 110 to connect a call with end terminals, and a Privacy database 170 (also referred to as a "management network") to manage treatment of a call and additional operations. Some embodiments of the invention may further include components of additional networks, such as a signaling system #7 (SS7) network (not shown), to complete the call and perform call treatment. The network 100 may incorporate features and methods for controlling communications and implementing call compliance as disclosed in U.S. Patent Publications 2007/0136789, 2006/0159060, 2006/0045070, 2005/0226151, 2005/0226221, 2005/0249209, and 2006/0159060, and U.S. Pat. Nos. 6,130,937, 6,788,773, 7,158,630, 7,194,075 and 7,574,471, the entirety of which are incorporated herein by reference.

The carrier network 110 includes a voice switch 135 (also referred to as "switch"), which connects with a number of end terminals that may be employed by an end user to initiate and conduct a call, including a land-line telephone 115 and a plurality of telephones 116a-c connected to the switch 135 via a private branch exchange (PBX) 117. In some embodiments such as a broadband network, the switch may be referred to as the service switching function (SSF), softswitch, or broadband switch. In further embodiments such as an SS7 network, the switch is commonly referred to as a service switching point (SSP). Also connected to the switch 135 is a server (also referred to as "media server") 130, which is configured to perform functions associated with a call as described in further detail below. A further switch 136, connected to an additional terminal 118, may be a member of the carrier network 110, or may comprise a portion of a second carrier network (not shown).

The carrier network 110 includes a service control function (SCF) 150 operable to establish a call between an origin end terminal (e.g., telephone 115) and a destination end terminal (e.g., telephone 118) by connecting associated switches 135, 136 and the media server 130. In some embodiments, the connection may be established with the use of signal transfer points (STPs) (not shown). During a typical operation to establish a call, an origin end terminal, such as the telephone 115, draws a dial tone and dials a number corresponding to a destination (e.g., telephone 118). The dialed number is forwarded by the switch 135 to the SCF 150. The SCF 150 determines how the call is to be routed between the origin and destination. The SCF 150 routes control messages to the switches 135, 136 selected to carry the voice content of the call. As a result, a call is established between the origin (telephone 115), the destination (telephone 118) and includes the media server 130 as part of the call. Further operations of a typical telecommunications networks are well understood in the art and will not be described further herein.

The Privacy database 170 includes Do Not Call (DNC) rules 180, which maintains and updates entries on contact information (e.g., telephone number) and respective permissions. The DNC rules 180 may be maintained and updated based on information available at one or more data stores 185a-g. The data stores may include exemption management 185a, which indicates exemptions to particular entries on a DNC list; preferences 185b, which indicates particular contact preferences associated with entries; internal lists 185c, which indicates entries specific to a subscriber of a call compliance service, and may include entries provided in response to post-call disposition; cellular lists 185d, which indicates entries for mobile telephone numbers; Direct Marketing Association (DMA) lists 185e, which includes entries of potential customers provided by a third party; state lists 185f, which includes entries corresponding to one or more state DNC list; and national lists 185g, which includes entries corresponding to a national DNC list.

A rules engine 186 processes the entries and information at the data stores 185a-g to determine which entries may be contacted and which entries may not be contacted. This determination provides the DNC rules 180 with a unified set of entries and corresponding permissions. The DNC rules 180, data stores 185a-g and rules engine may incorporate features of a call compliance system as disclosed in U.S. Pat. Nos. 6,130,937, 6,788,773, 7,158,630, 7,194,075 and 7,574,471, the entirety of which are incorporated herein by reference.

The Privacy database 170 further includes recording rules 190, which maintains and updates entries on contact information (e.g., telephone number) and respective permissions. The recording rules 190 may be maintained and updated based on information available at one or more data stores 195a-c. The data stores may include consent lists 195a, which indicates particular contact preferences associated with entries; authorization lists 195b, which indicates relevant laws and regulations associated with a jurisdiction corresponding to entries; and exemption lists 195c, which indicates exemptions to particular entries on a recording permissions list.

A rules engine 196 processes the entries and information at the data stores 195a-c to determine which entries may be contacted and which entries may not be contacted. This determination provides the recording rules 180 with a unified set of entries and corresponding permissions.

The Privacy database 170 further includes a data store for subscription permissions 185. The subscription permissions data store 185 maintains entries associated with a subscriber to services provided by the Privacy database 170, including the automatic number identification (ANI) or telephone numbers of end terminals employed by the subscriber to establish calls. Permissions associated with each of the entries may indicate enforcement of compliance to the DNC rules 180 and recording rules 190, and may further indicate parameters relating to a call. For example, an entry for a subscriber terminal may indicate that, for calls originating from that terminal, the call is to be recorded. This indication is forwarded to the SCF 150, which creates a parameter for an established call based on this indication. As a result, the server 130 conducts a recording of the call. A data repository 175 may be configured to store a recording of the call and other information related to the call.

The network 100 supports for a service providing compliance with privacy and recording laws and DNC regulations, as well as further operations, such as post-call disposition and call monitoring. A subscriber to the service possesses one or more end terminals (e.g., telephones 115, 116a-c) for initiating and receiving calls. Upon enrollment in the service, the subscriber identifies all of the lines at the carrier network 110 that are to be activated for the service. For each of these lines, a trigger is set on the switch 135 to direct the switch to query the SCF 150 when calls are placed from or to that line, and may detect when the service is enabled or disabled. Based on this query, which may indicate the origin ANI and destination number, the SCF 150 evaluates the query against the DNC database 180 and the subscription permissions 185. Based on this evaluation, the SCF 185 determines whether the call will be established, and whether additional call processing will be provided.

Operation and additional features of the service and communications network 100 are described below with reference to FIGS. 2A-B, 3, 4 and 5A-5C. In particular, the network 100 may be configured to conduct one or more of the operations relating to selective establishment of the call, call disposition, and call monitoring as described below. Further, the network 100 may be adapted to one or more communications networks or network technologies, such as an IP multimedia subsystem (IMS) network (see FIGS. 2A-B), a global system for mobile communications (GSM) network (see FIG. 3), a long term evolution (LTE) network (see FIG. 4), and a signaling system #7 (SS7) network (FIGS. 5A-C).

Figure 2A:
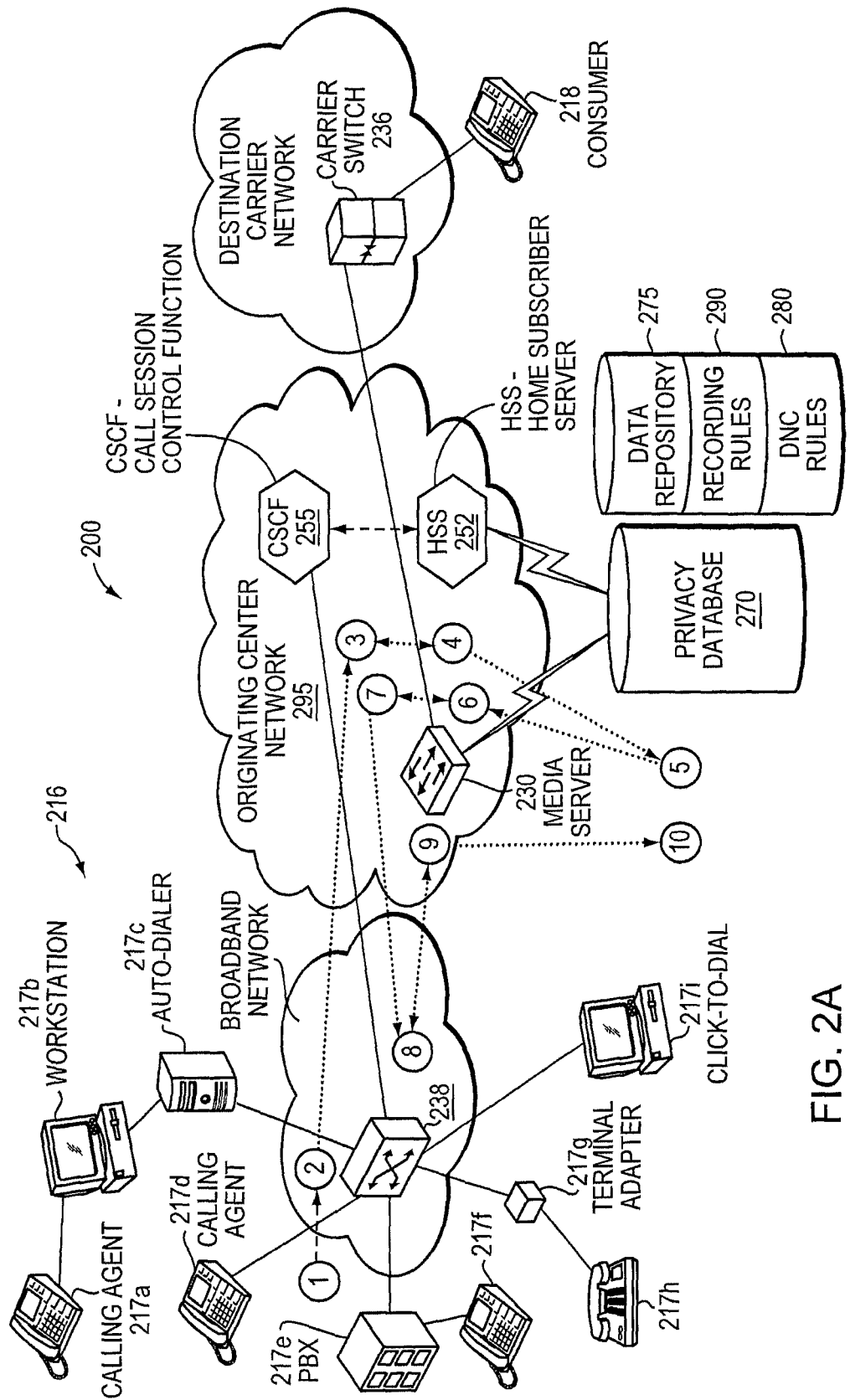
FIG. 2A is a flow diagram illustrating selective establishment and recording of a call in an IP multimedia subsystem (IMS) network according to one embodiment.

FIG. 2A is a flow diagram illustrating selective establishment and recording of a call in an IP multimedia subsystem (IMS) network 200 according to one embodiment. The network 200 may include features and components as described above with reference to FIG. 1. The network 200 includes an origin terminal 216, which may include one or more of a number of networked devices and configurations, such as a land-line telephone 217a connected to a computer workstation 217b and using an automated or predictive dialer 217; a land-line telephone 217d; a land-line telephone 217f connected to a PBX 217e; a telephone 217h connected to a network terminal adapter 217g; and a voice-over-IP (VoIP) click-to-dial computer interface 217i.

The origin terminal 216 connects to an originating carrier network 295 via a router 238 of a broadband network. The broadband router 238 routes IMS related communications to a call service control function 255 (a configured SCF) for establishing a call, and, once a call is established, routes a trunk to a media server 230. The media server 230, in turn, routes the trunk to a second carrier switch 236 at a destination carrier network, the second switch 236 being connected to a destination terminal 218. Alternatively, the media server 230 may be communicatively coupled to an additional switch (not shown), where the additional switch routes the trunk to the second carrier switch 236.

The network 200, through implementation of a Privacy database 270 including a data repository 275, recording rules 290 and DNC rules 280, provides a service to a subscriber at the origin for monitoring of calls and compliance with privacy and DNC regulations. Bypassing of the network service may be enabled on a per-call basis. This may be done by a user at the origin dialing a code that indicates that the dialed number of the next call is not to be processed by the network service.

A process for providing the network DNC service is described below, with reference to the numerals shown in FIG. 2.

1) A calling agent at the origin terminal 216 (connected via a service-subscribed line) dials a number corresponding to the destination 218. If another carrier network (not shown) is the primary carrier for the subscribed line, the agent enters a Carrier Access Code (CAC) to direct the switch to place the call on the appropriate network.

2) The call is held at the broadband switch 238 while the switch 238 generates a call origination request to the call session control function (CSCF) 255 for the subscribed line. When the subscribed line sits behind a PBX 217e, the PBX 217e provides the identification of the subscribed line (e.g. ANI or Calling Party Number) on the PRI D channel so that the switch 235 can generate a call origination query to the CSCF 255 for the appropriate line. The calling party and ANI provided by the PBX may be different numbers. In such a case, the query may be based on calling party number. In alternative embodiments employing a mobile phone at the origin, a Mobile Station ID (MSID) number is the identifier for mobile numbers.

3) The CSCF 255 receives the call origination request and requests data from the home subscriber server (HSS) 252 application servers for subscriber information. The query may identify both the origin and terminating (destination) numbers.

4) The HSS 252 receives the subscriber information request and forwards the request to the Privacy database 270.

5) The Privacy database 270 receives information including both the origination and terminating numbers corresponding to the request.

6) The Privacy database 270 process the request and returns an "allow" or "not-allow" call message to the HSS 252 along with indication on whether call recording is to be performed.

7) The call routing results are sent to the CSCF 255, the CSCF 255 then determining how to route the call and the appropriate media server to bridge onto the call.

8) The broadband switch 238 routes the call to the destination carrier switch 236 and bridges onto the call a media server 230 for call recording or playback of automated messages.

9-10) Once the call is completed, and the contents of the call have been recorded, the media server 230 forwards the file containing the contents of the call to the Privacy database 270 along with identifying information about the call. The contents of the call may be stored to the data repository.

If the call is not allowed (as indicated by a "not-allow" message from the Privacy database 270), the media server 230 receives the call and plays an announcement back to the origin terminal 216 agent that the call is not permitted. The announcement may provide information to an end user regarding compliance with privacy or DNC regulations.

If the call is allowed (as indicated by an "allow" message from the Privacy database 270), the CSCF 255 instructs the switch 238 to establish the call to the terminating number, connecting the call to the destination terminal 218. The call may be routed through the media server 230 (or through a switch (not shown) communicatively coupled to the media server 230) to perform additional functions such as call monitoring and call disposition. Alternatively, the call may be routed to bypass the media server 230. When a call is terminated (i.e. the parties hang up) a message containing information about the call is generated by the switch 238 or by the media server 230. This message may be processed at a later time by the carrier network, and those messages associated with the network DNC service are forwarded to Privacy database 270. These messages provide call information such as whether or not the call was answered and the length of the call. Additional functions, such as call disposition and monitoring, may also be performed in the network 200 and are described below with reference to FIGS. 5A-C. In some embodiments such as IP Multimedia Subsystem (IMS) networks, these messages may be referred to as web services or Application Programming Interface (API) calls. In other embodiments such as SS7 networks, these messages may be referred to as Call Detail Records (CDRs).

Figure 2B:
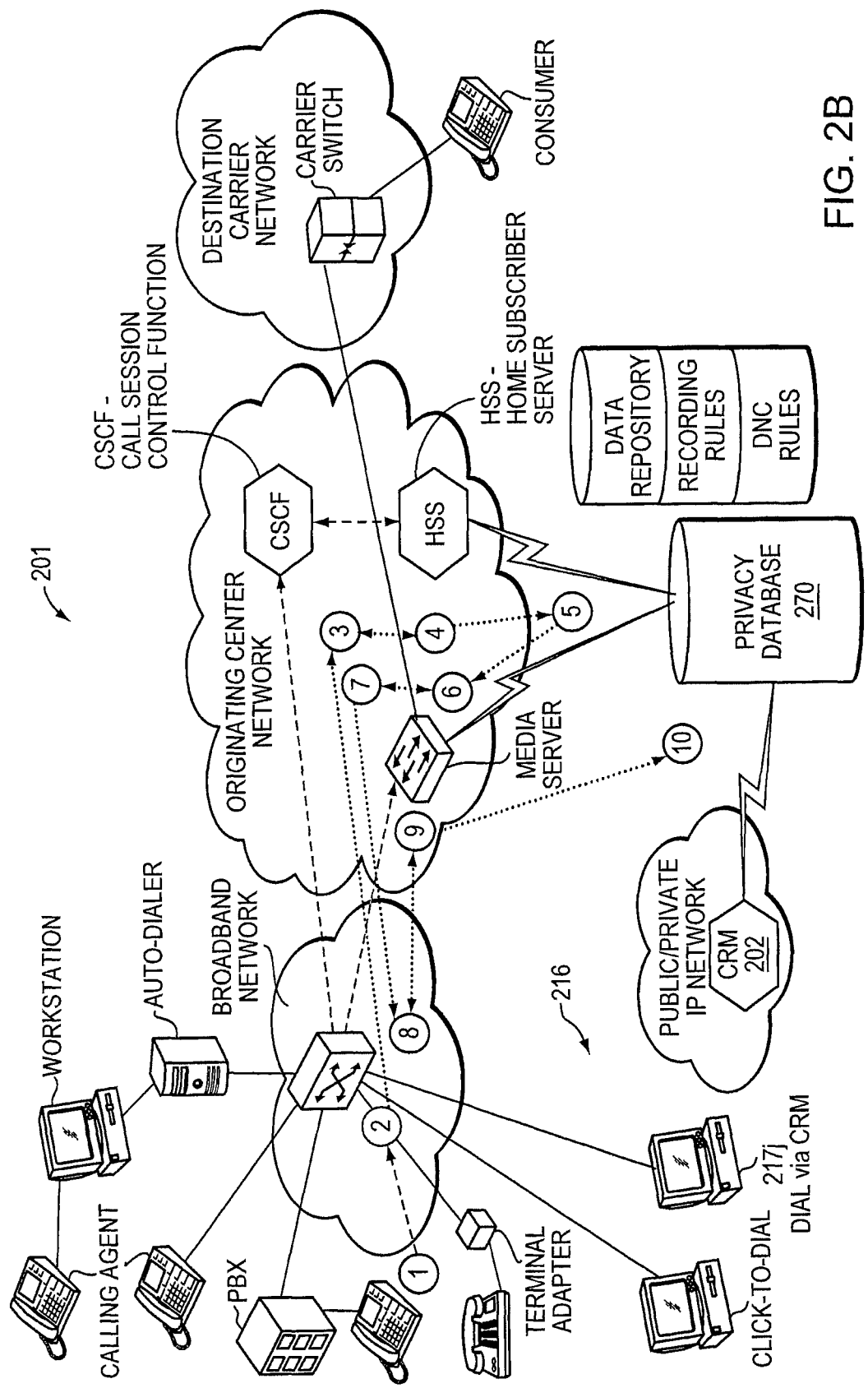
FIG. 2B is a flow diagram illustrating selective establishment and recording of a call in an IP multimedia subsystem (IMS) network and a customer relationship management (CRM) network according to one embodiment.

FIG. 2B is a flow diagram illustrating selective establishment and recording of a call in an IP multimedia subsystem (IMS) network 201 and a customer relationship management (CRM) network 202 according to one embodiment. The network 201 may be configured as the network 200 described above with reference to FIG. 2A, with the addition of a CRM network 202 in communication with the Privacy database 270. The CRM database 202 stores and manages entries on clients and/or prospective clients for a subscriber to the network privacy and DNC service. For example, the CRM database may maintain information on clients in a relational manner including contact information, contact preferences, transaction records, and previous interactions with the client. The CRM database 202 may update this information based on information in the Privacy database 270, including contact preferences (e.g., records of post-call disposition) and call information such as a recording of the call or a time and duration of the call.

An origin terminal 216, such as a computer interface 217j in communication with the CRM network 202, may import the CRM data to inform future calls to a present or prospective client.

Figure 3:
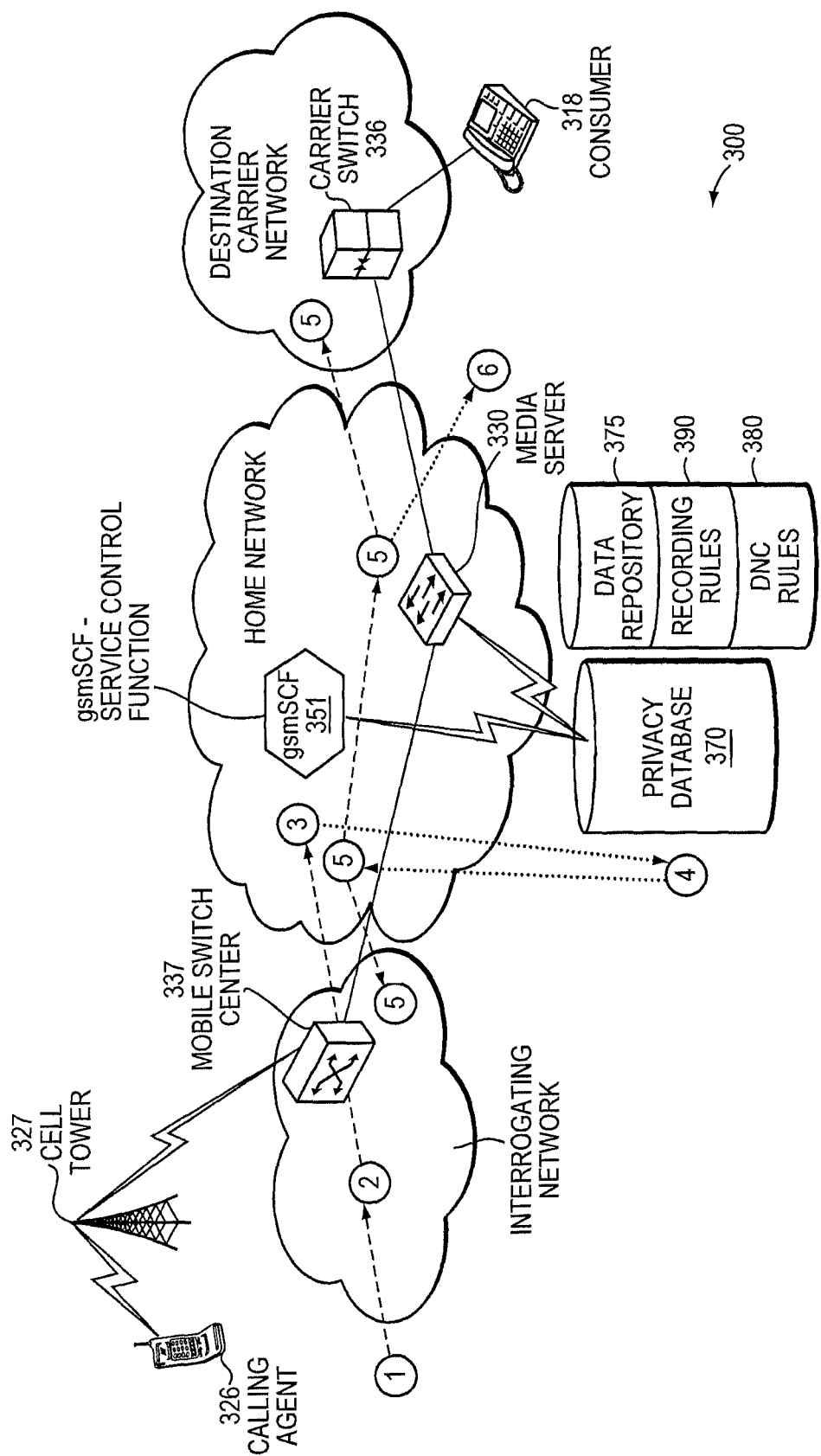
FIG. 3 is a flow diagram illustrating selective call recording in a global system for mobile communications (GSM) network according to one embodiment.

FIG. 3 is a flow diagram illustrating selective call recording in a global system for mobile communications (GSM) wireless network 300 according to one embodiment. The network 300 may include features and components described above with reference to FIGS. 2A-B, with the exception of a wireless network architecture, including a wireless tower 327 and mobile switching center 337, to support a wireless subscriber line at a mobile terminal 326. A process for providing a network DNC service with wireless call recording is described below, with reference to the numerals shown in FIG. 3.

1) A calling agent at the origin terminal 326 (connected via a service-subscribed line) dials a number corresponding to the destination 318. The originating call can be placed from either the home carrier network or a visiting/roaming carrier network.

2) The call is held at the mobile switch 337 while the switch 337 generates a call origination query to the Global System for Mobile communication System Control Function (gsmSCF) 351 of the home network for the subscribed line.

3) The gsmSCF 351 receives the call origination query and sends a call certification query to the Privacy database 370; information sent to the Privacy database 370 include both the origination and terminating numbers.

4) The Privacy database 370 processes the request and send back "allow" or "not-allow" call message as well as an indication of whether or not call recording should be implemented.

5) The call routing results are then used by the gsmSCF 351 to direct the mobile switch 337 with routing instructions to complete the call and to bridge the media server 330 onto the call for call recording.

6) Once the call is completed and the entire contents of the call have been recorded, the media server 330 forwards a file containing the contents of the call to the Privacy database along with identifying information about the call.

Figure 4:
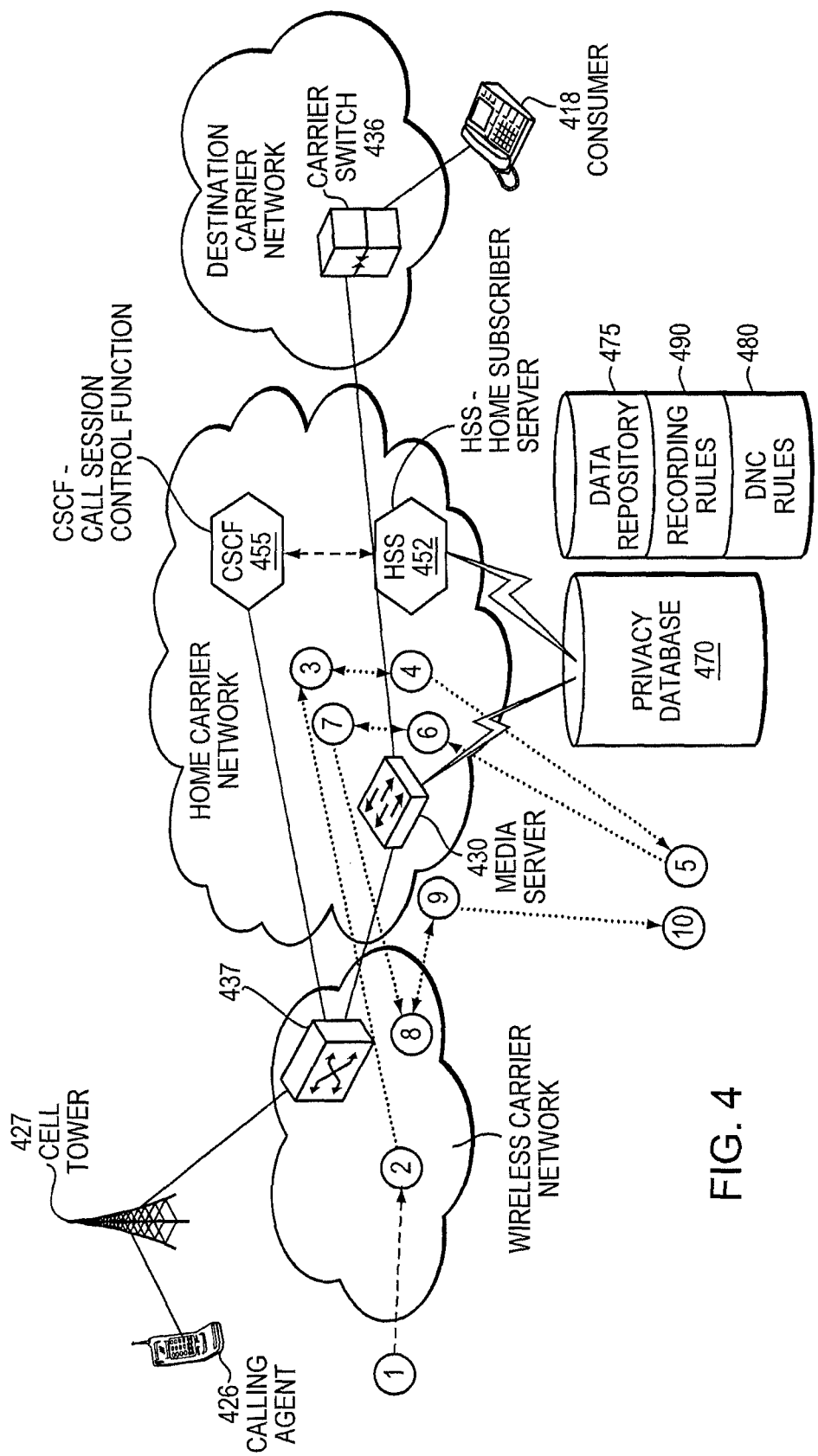
FIG. 4 is a flow diagram illustrating selective call recording in a long term evolution (LTE) network according to one embodiment.
Figure 5A:
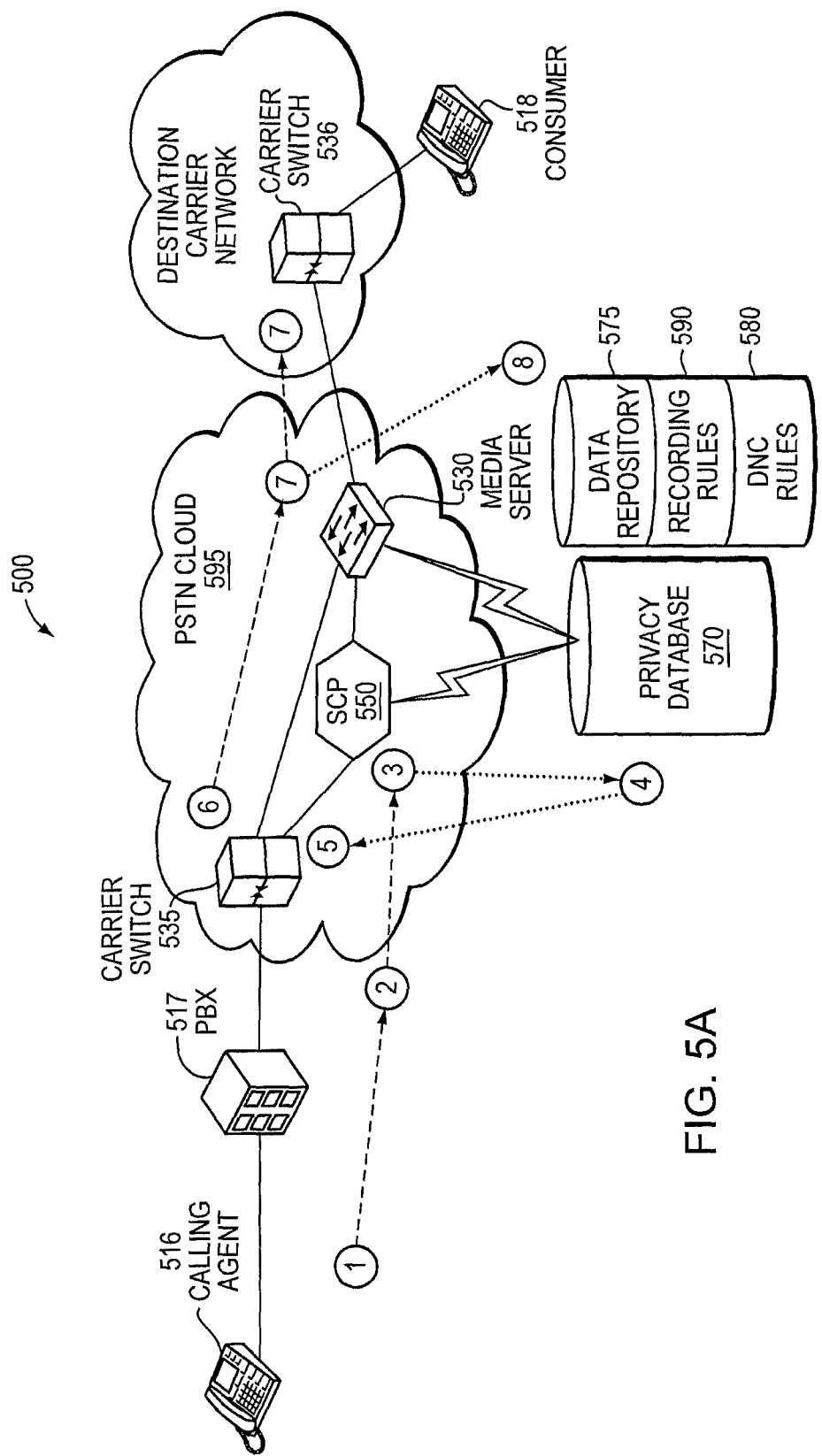
FIGS. 5A-C are flow diagrams illustrating call monitoring and disposition in a signaling system #7 (SS7) network according to a plurality of embodiments.
Figure 5B:
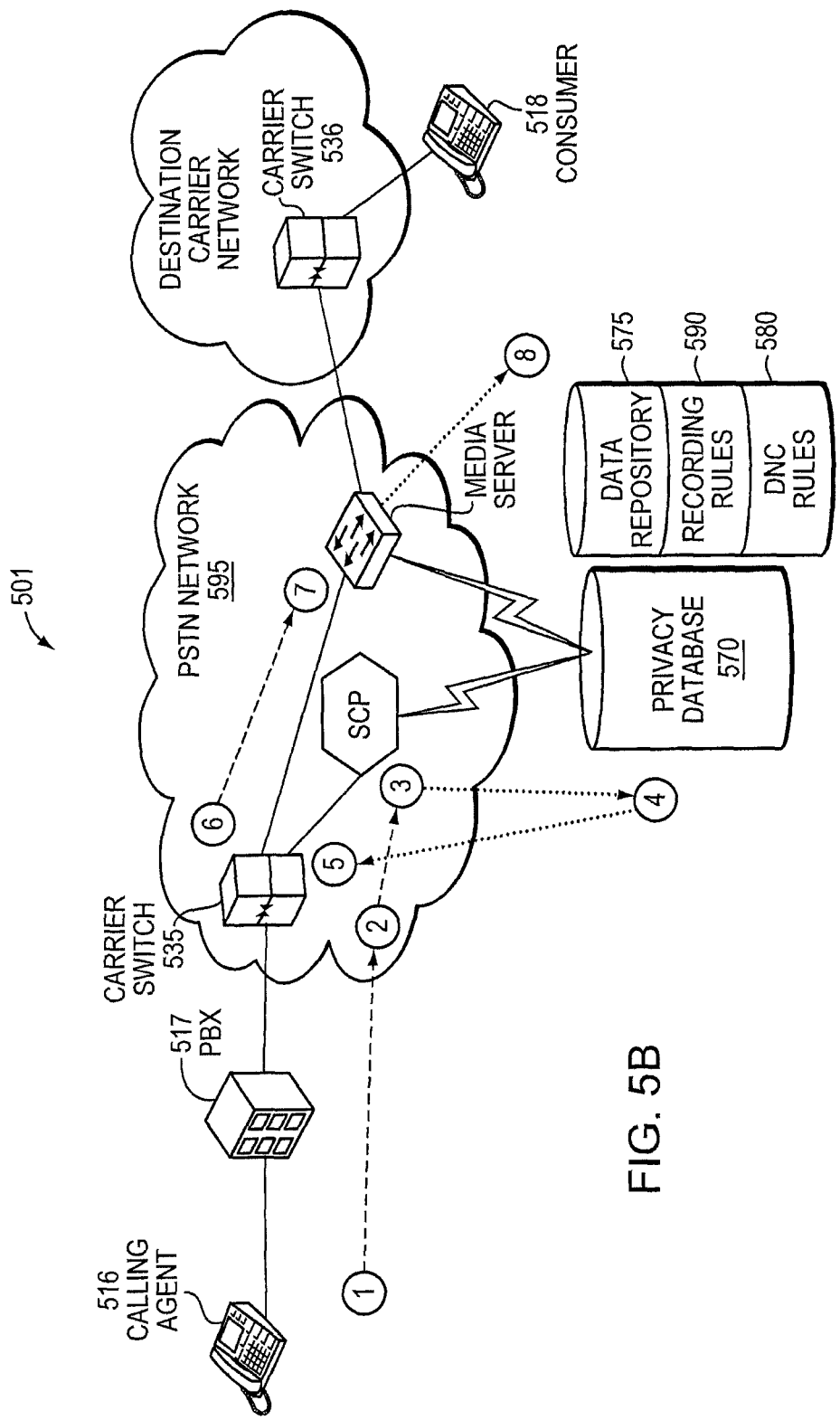
Figure 5C:
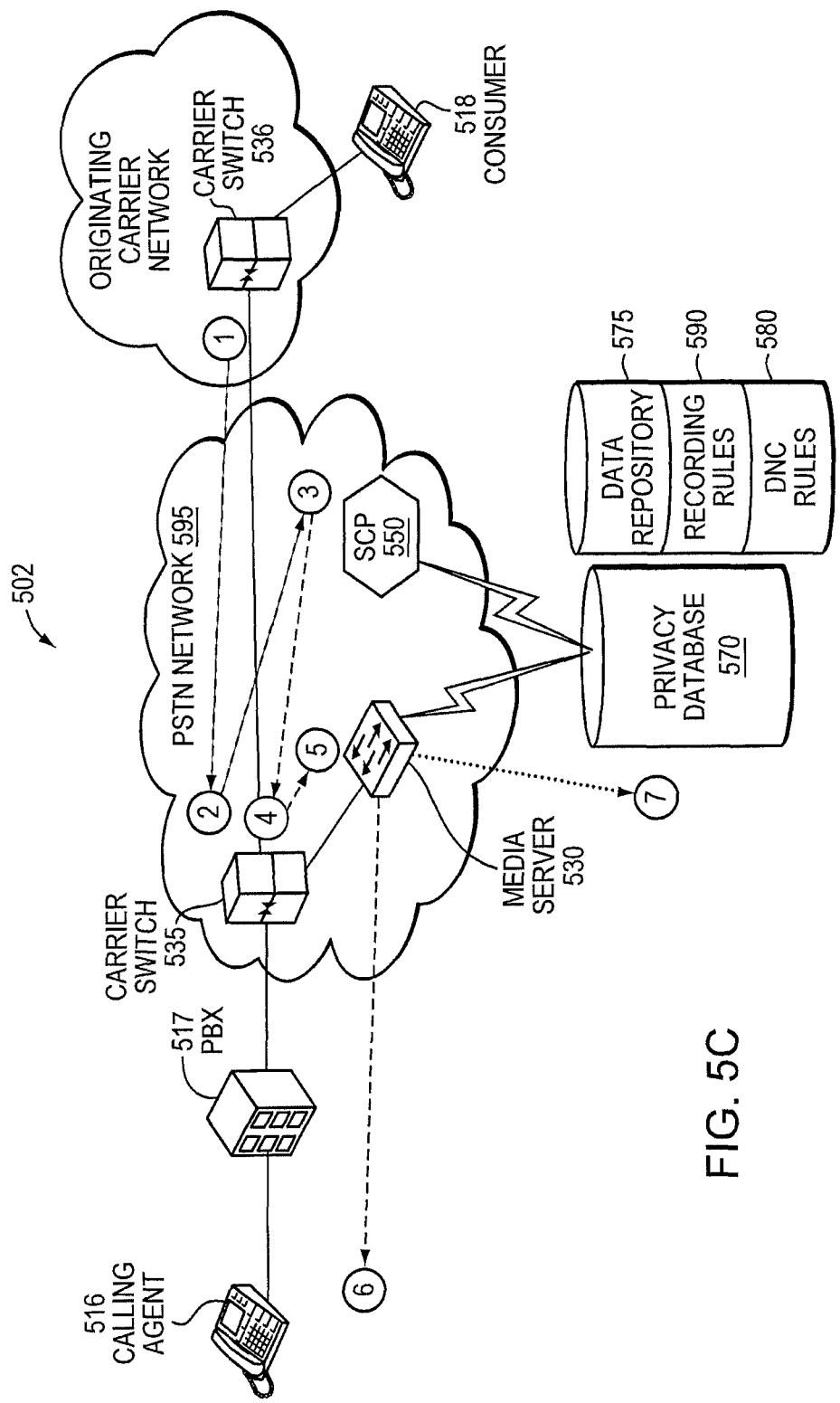

FIG. 4 is a flow diagram illustrating selective call recording in a long term evolution (LTE) network 400 according to one embodiment. The network 400 may include features and components described above with reference to FIGS. 2A-B, with the exception of a wireless network architecture such as that described above with reference to FIG. 3, including a wireless tower 427 and mobile switching center 437, to support a wireless subscriber line at a mobile terminal 426. A process for providing a network DNC service with wireless call recording is described below, with reference to the numerals shown in FIG. 4.

1) A calling agent at the origin terminal 416 (connected via a service-subscribed line) dials a number corresponding to the destination 418.

2) The call is held at the broadband switch 438 while the switch 438 generates a call origination request to the call session control function (CSCF) 455 for the subscribed line. A Mobile Station ID (MSID) number may be the identifier for mobile numbers.

3) The CSCF 455 receives the call origination request and requests data from the home subscriber server (HSS) 452 application servers for subscriber information. The query may identify both the origin and terminating (destination) numbers.

4) The HSS 452 receives the subscriber information request and forwards the request to the Privacy database 470.

5) The Privacy database 470 receives information including both the origination and terminating numbers corresponding to the request.

6) The Privacy database 470 process the request and returns an "allow" or "not-allow" call message to the HSS 452 along with indication on whether call recording is to be performed.

7) The call routing results are sent to the CSCF 455, the CSCF 455 then determining how to route the call and the appropriate media server to bridge onto the call.

8) The broadband switch 438 routes the call to the destination carrier switch 436 and bridges onto the call a media server 430 for call recording or playback of automated messages.

9-10) Once the call is completed, and the contents of the call have been recorded, the media server 430 forwards the file containing the contents of the call to the Privacy database 470 along with identifying information about the call. The contents of the call may be stored to the data repository.

FIG. 5A is a flow diagram illustrating outbound call monitoring in a signaling system #7 (SS7) network 500 according to one embodiment. The network 500 may include features and components as described above with reference to FIGS. 1, 2A-B, 3 and 4. The network 500 includes an origin terminal 516 (e.g., a land-line telephone) connected to a public switched telephone network (PSTN) "cloud" 595 via a PBX 517. In other embodiments, a wireless mobile telephone or VoIP telephone, with associated network elements, may be employed as the origin. A carrier switch 535 (Service Switching Point (SSP)) routes SS7 communications to an SCF 550 (e.g., a service control point (SCP)) for establishing a call, and, once a call is established, routes a voice trunk to a media server 530. The media server 530, in turn, routes the voice trunk to a second carrier switch 536 across the PSTN cloud, the second PSTN switch being connected to a destination terminal 518. Alternatively, the media server 530 may be communicatively coupled to an additional switch (not shown), where the additional switch routes the voice trunk to the second carrier switch 536.

When call recording is provided, and a call is originated from the subscribed line (origin terminal 516), the carrier switch 535 connects the call with a media server 530 such that the media server may monitor and generate an audio recording of the call. Once recorded, the contents of the call, as well as additional information about the call (e.g., origin number, destination number, time and date) may be forwarded to the Privacy database 570 for storage and analysis. The Privacy database 570 may include an entry indicating which of the subscribed lines include the call recording feature, indicating to the SCF 550 to enable the feature.

The network 500, through implementation of a Privacy database 570 including a DNC database 580, provides a service to a subscriber at the origin for compliance with DNC regulations and call recording. A process for providing the network DNC service with call recording is described below, with reference to the numerals shown in FIG. 5A.

1) A calling agent at the origin terminal 516 (connected via a service-subscribed line) dials a number corresponding to the destination 518. If another carrier network (not shown) is the primary carrier for the subscribed line, the agent enters a Carrier Access Code (CAC) to direct the switch to place the call on the appropriate network.

2) The call is held at the carrier switch 535 while the switch 535 generates a call origination query to the SCF 550 for the subscribed line. When the subscribed line sits behind a PBX 517, the PBX 517 provides the identification of the subscribed line (e.g. ANI or Calling Party Number) on the PRI D channel so that the switch 535 can generate a call origination query to the SCF 550 for the appropriate line. The calling party and ANI provided by the PBX may be different numbers. In such a case, the query may be based on calling party number. In alternative embodiments employing a mobile phone at the origin, a Mobile Station ID (MSID) number is the identifier for mobile numbers.

3) The SCF 550 receives the call origination query and sends a call certification query to the Privacy database. The query may identify both the origin and terminating (destination) numbers.

4) The Privacy database 570 process the call certification query and returns an "allow" or "not-allow" call message to the SCF 550, along with call parameters indicating additional service features (e.g., call monitoring, call disposition) to be performed.

5) The call routing results are sent from the SCF 550 back to the carrier switch 535, and the call is processed (i.e., established or not established) by the switch 535 based on the SCF 550 call routing information.

6) The carrier switch 550 routes the call to a media server 530 in the PSTN cloud 595 in response to the SCF 550 indicating that the call needs to originate through a media server 530 (e.g., for call monitoring or playback of automated messages).

7) If the call is not allowed (as indicated by a "not-allow" message from the Privacy database 570), the media server 530 receives the call and plays an announcement back to the origin terminal 516 agent that the call is not permitted. The announcement may provide information to an end user regarding compliance with DNC regulations.

If the call is allowed (as indicated by an "allow" message from the Privacy database 570), the SCF 550 instructs the carrier switch 535 to establish the call to the terminating number, connecting the call to the destination terminal 518. The media server 530 may be connected in-line with the voice trunk of the call, or may be otherwise in communication with the carrier switches 535, 536 in a manner enabling recording of the call.

8) Once the call is completed and the media server 530 has recorded the entire contents of the call, the media server forwards the file containing the contents of the call to the Privacy database 570 along with identifying information about the call, such as the originating number, the terminating number and with the date and time of the call.

FIG. 5B is a flow diagram illustrating call disposition in a signaling system #7 (SS7) network 501 according to one embodiment. The network 501 may be configured in a similar manner as the SS7 network 500 described above with reference to FIG. 5A, and may include features and components as described above with reference to FIGS. 1A, 1B and 2. The network 500 includes a origin terminal 516 (e.g., a land-line telephone) connected to a public switched telephone network (PSTN) "cloud" 595 via a PBX 517. In other embodiments, a wireless mobile telephone or VoIP telephone, with associated network elements, may be employed as the origin. A carrier switch 535 (SSP) routes SS7 communications to an SCF 550 for establishing a call, and, once a call is established, routes a voice trunk to a media server 530. The media server, in turn, routes the voice trunk to a second carrier switch 536 across the PSTN cloud, the second PSTN switch being connected to a destination terminal 518.

When call disposition is provided (e.g., as a feature of a network DNC service), and a call is originated from the subscribed line (origin terminal 516), the carrier switch 535 connects the call with a media server 530 so that dual-tone multi-frequency signaling (DTMF) tones can be detected during the call, the DTMF tones indicating the call disposition. For example, a dialed code "#0" would indicate that the dialed number should be added to the internal DNC list (e.g., list 185c in FIG. 1) for the subscriber. The Privacy database 570 may include an entry indicating which of the subscribed lines include the call disposition feature, indicating to the SCF 550 to enable the feature.

The network 501, through implementation of a Privacy database 570 including a DNC database 580, provides a service to a subscriber at the origin for compliance with DNC regulations and call disposition. A process for providing the network DNC service with call disposition is described below, with reference to the numerals shown in FIG. 5B.

1) A calling agent at the origin terminal 516 (connected via a service-subscribed line) dials a number corresponding to the destination 518. If another carrier network (not shown) is the primary carrier for the subscribed line, the agent enters a Carrier Access Code (CAC) to direct the switch to place the call on the appropriate network.

2) The call is held at the carrier switch 535 while the switch 535 generates a call origination query to the SCF 550 for the subscribed line. When the subscribed line sits behind a PBX 517, the PBX 517 provides the identification of the subscribed line (e.g. ANI or Calling Party Number) on the PRI D channel so that the switch 535 can generate a call origination query to the SCF 550 for the appropriate line. The calling party and ANI provided by the PBX may be different numbers. In such a case, the query may be based on calling party number. In alternative embodiments employing a mobile phone at the origin, a Mobile Station ID (MSID) number is the identifier for mobile numbers.

3) The SCF 550 receives the call origination query and sends a call certification query to the Privacy database. The query may identify both the origin and terminating (destination) numbers.

4) The Privacy database 570 process the call certification query and returns an "allow" or "not-allow" call message to the SCF 550, along with call parameters indicating additional service features (e.g., call monitoring, call disposition) to be performed.

5) The call routing results are sent from the SCF 550 back to the carrier switch 535, and the call is processed (i.e., established or not established) by the switch 535 based on the SCF 550 call routing information.

6) The carrier switch 550 routes the call to a media server 530 in the PSTN cloud 595 in response to the SCF 550 indicating that the call needs to originate through a media server 530 to provide call disposition, as well as other possible functions (e.g., call monitoring or playback of automated messages).

7) If the call is not allowed (as indicated by a "not-allow" message from the Privacy database 570), the media server 530 receives the call and plays an announcement back to the origin terminal 516 agent that the call is not permitted. The announcement may provide information to an end user regarding compliance with DNC regulations.

If the call is allowed (as indicated by an "allow" message from the Privacy database 570), the SCF 550 instructs the carrier switch 535 to establish the call to the terminating number, connecting the call to the destination terminal 518. The media server 530 may be connected in-line with the voice trunk of the call, or may be otherwise in communication with the carrier switches 535, 536 to monitor the call for DTMF tones.

8) When the media server 530 detects a call disposition event (e.g., a compliant DTMF code) during a call, the server 530 generates and forwards a message to the Privacy database 570 that provides the disposition code entered as well as the originating number, terminating number and date and time of the call during which the DTMF code was entered.

The network 501 may be configured to perform additional operations, such as call recording, as described below with reference to FIGS. 5A and 5C.

In some embodiments, a network may be configured to selectively monitor and generate a recording of a call across the network. Call recording may be conducted, for example, to monitor a subscriber's compliance with relevant business practices and regulations. To accomplish call recording for a call initiated by a subscriber (an outbound call), a query to a Privacy database may include a query as to whether the call should be recorded. If the answer to the query is positive, then a media server may be implemented to record the call. To accomplish call recording for a call to a subscriber, initiated by an outside line (an inbound call), a carrier switch may be configured with a "trigger" to initiate a query similar to that described above. FIGS. 4A-4E illustrate various methods of call recording, and are described below.

FIG. 5C is a flow diagram illustrating inbound call monitoring in a signaling system #7 (SS7) network 502 according to one embodiment. The network 502 includes the same features and components described above with reference to FIG. 5B, yet is configured to establish and record an inbound call to a subscriber line (terminal 516) from an outside line (terminal 518). To process such incoming calls, a Terminating Attempt Trigger (TAT) (not shown) is set at the carrier switch 535, and directed to the subscribed line, such that when a call is set to terminate on a subscribed line, the carrier switch 535 will hold the incoming call while a query to the SCF 550 is made to determine if the call should be recorded. If the call is to be recorded, the response by the SCF will indicate to the carrier switch 535 to route the call through a media server 530 so that the call can be recorded. A process for providing the network DNC service with inbound call recording is described below, with reference to the numerals shown in FIG. 5C.

1) An outside phone terminal 518 line places a call on a respective DID line to a subscriber terminal 516.

2) A Terminating Attempt Trigger "TAT" is set on the subscriber line such that, responsive to the call, the carrier switch 535 holds the call for additional call processing rules.

3) The carrier switch 535 places a query to the SCF 550 for additional call processing rules.

4) Results of the query, indicating call routing instructions, are sent from the SCF 550 back to the carrier switch 535. The carrier switch 535 routes the call based on the SCF 550 call routing information.

5) The carrier switch 535 routes the call to a media server 530 in the PSTN cloud 595 in response to the SCF 550 indicating that the call needs to originate through the media server 530 for call recording.

6) The media server 530 receives the call and completes the second leg of the call to the terminal 516, thereby establishing the call. The media server initiates recording of the call.

7) Once the call is completed and the media server 530 has completed an audio recording of the call, a file containing the contents of the call are forwarded to the Privacy database 570 along with identifying information about the call.

Figure 6A:
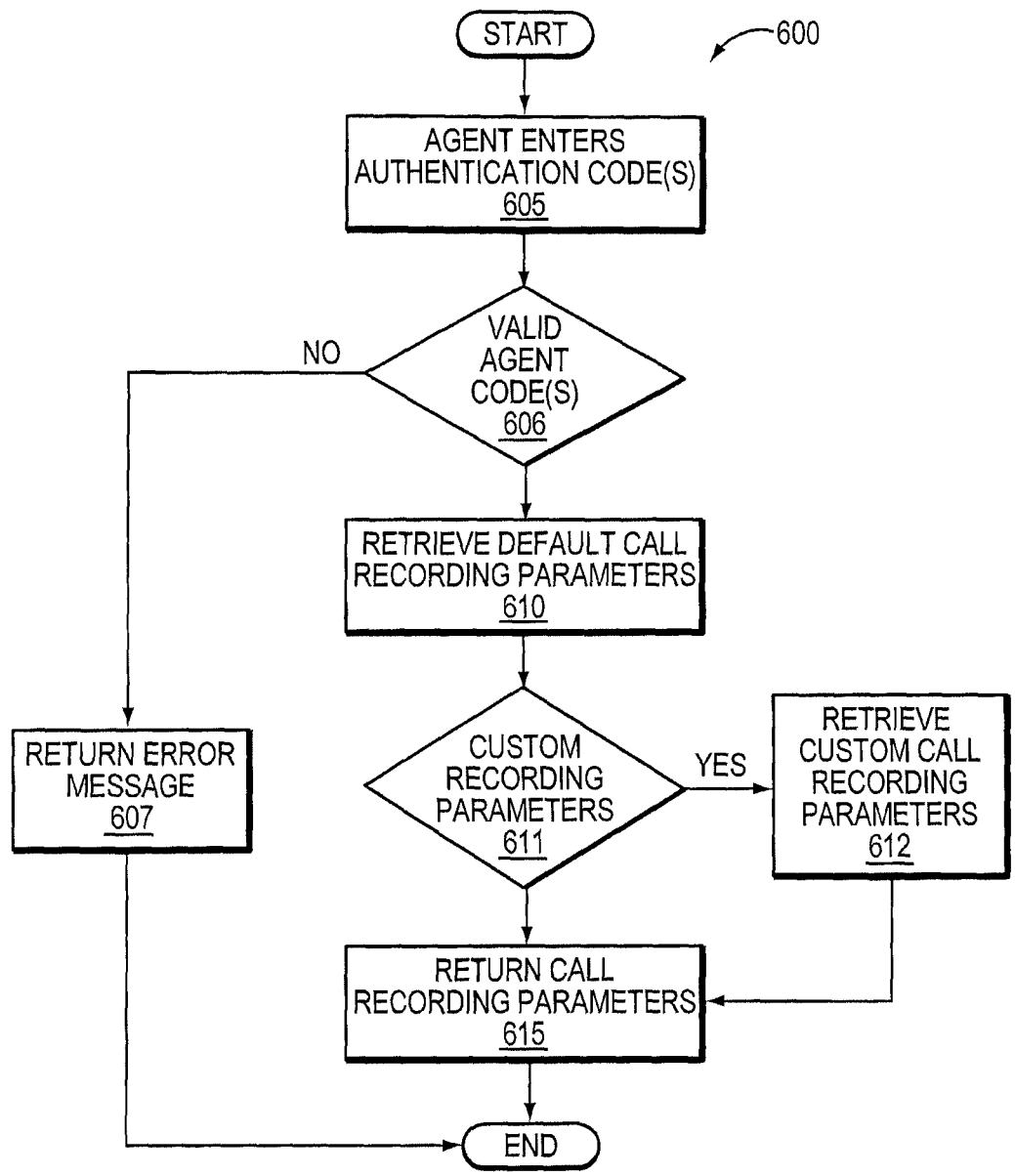
FIGS. 6A-C are flow diagrams illustrating call processing according to a plurality of embodiments.
Figure 6B:
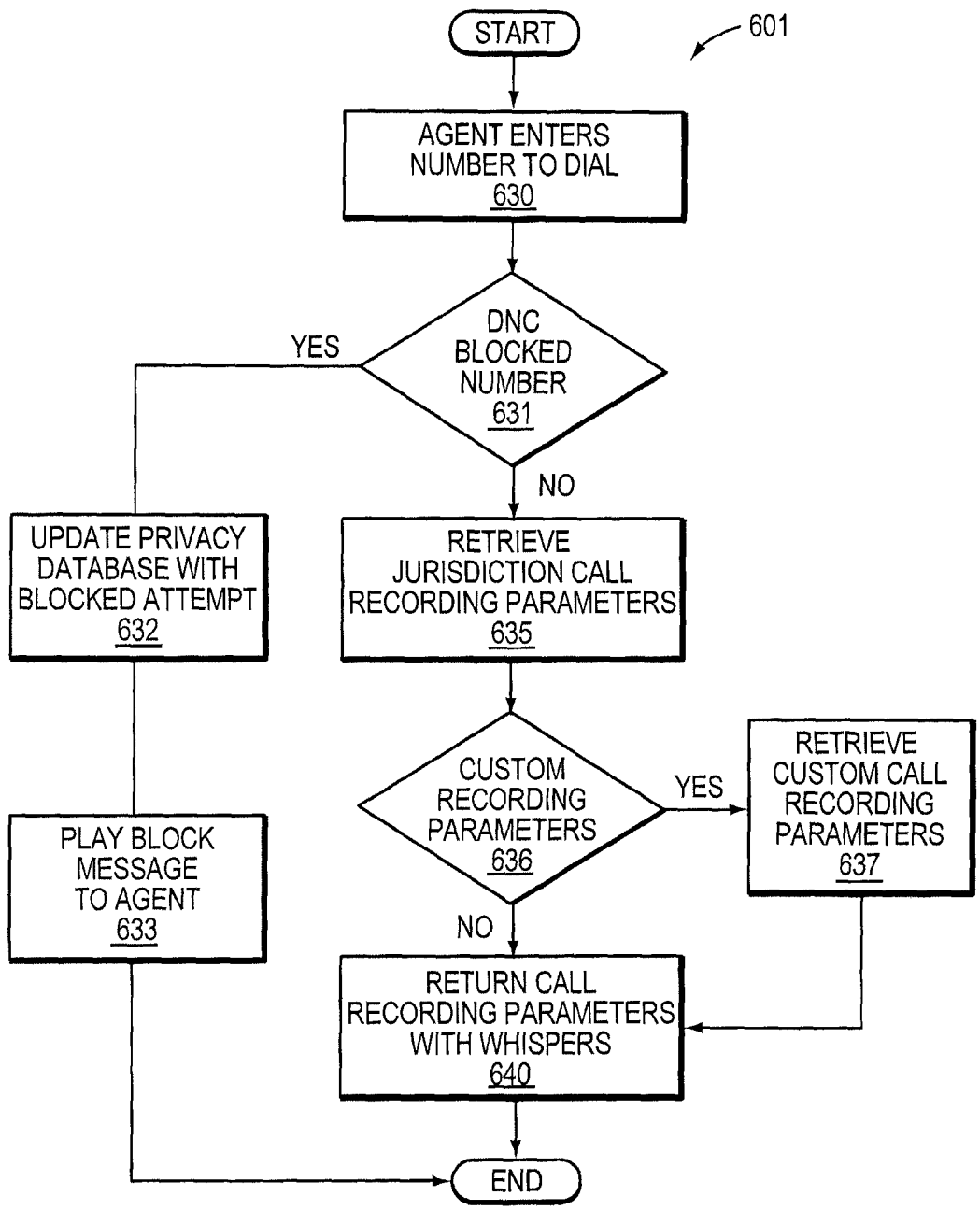
Figure 6C:
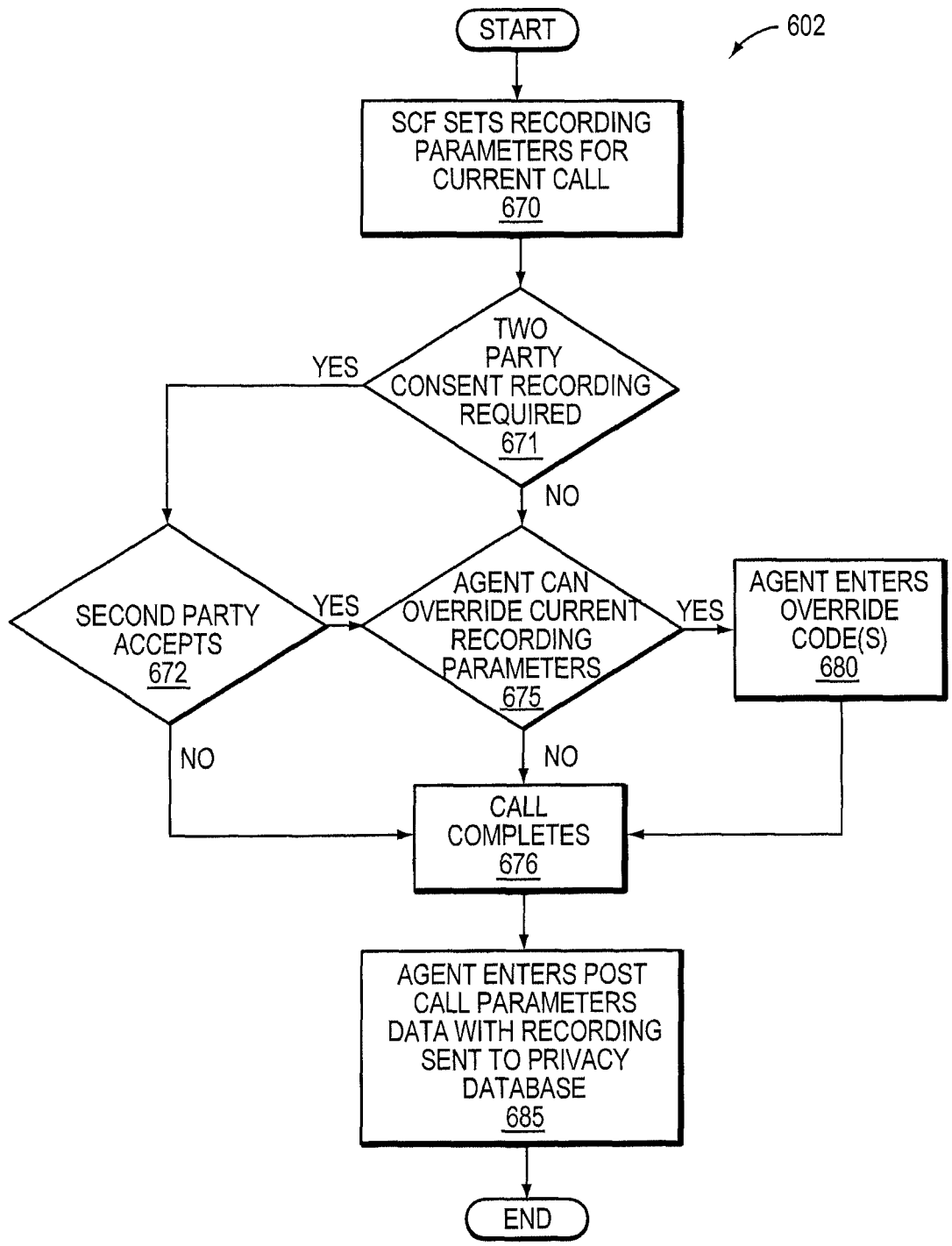

FIGS. 6A-C are flow diagrams illustrating call processing according to a plurality of embodiments. These processes may be implemented in the networks and methods described above with reference to FIGS. 1-5C, configured to operate as described below.

FIG. 6A is a flow diagram of a process 600 by which a calling agent (e.g., a subscribing user initiating a call at an origin) may obtain parameters for recording a call with a given destination as provided in a Privacy database. An agent enters authorization code(s) at a terminal in communication with the Privacy database to authenticate access to the database 605. The agent codes are checked for validity 606, and an error message is returned if the code is invalid 607. If the code is valid, then the Privacy database retrieves a set of default call recording parameters 610. Before returning the parameters to the agent, the Privacy database verifies whether the object entry is associated with custom recording parameters (e.g., a customer preference or exemption to a privacy regulation) 611. If so, those custom parameters are retrieved 612, and a unified set of call recording parameters is returned to the agent 615.

FIG. 6B is a flow diagram of a process 601 by which a calling agent initiates and establishes a call. The agent (at an origin terminal) dials a number to a destination 630. The Privacy database checks whether the number is a DNC blocked number 631. If so, then the Privacy database is updated with the blocked attempt 632, and an audio message is played back to the agent to indicate the block 633. If the number is not blocked, then the Privacy database retrieves recording parameters (e.g., state laws and regulations) associated with the jurisdiction of the destination 635. If there are any custom recording parameters associated with the destination (e.g., a customer preference or exemption to a privacy regulation) 636, then those parameters are retrieved as well 637 to return an accurate set of call recording parameters associated with the destination 640. The call recording parameters may be conveyed to the calling agent via an audio notification or other notice at the origin terminal.

FIG. 6C is a flow diagram of a process 602 by which recording parameters may be implemented in a call. A service control function (SCF), given the recording parameters for a call (e.g., via the process 601 of FIG. 6B), establishes the call under the recording parameters 670. If the parameters require two-party consent to record the call 671, and the second party (e.g., the call recipient at the destination) consents to the recording 672, then the agent may override the initial current recording parameters 675 by entering an override code 680. Upon completion of the call 676, the agent may perform post-call disposition by entering updated call parameter data at the origin terminal 685. The Privacy database receives the call parameter data and updates the call parameters associated with the destination accordingly, such that the updated parameters will be implemented in future calls to the destination.

Figure 7A:
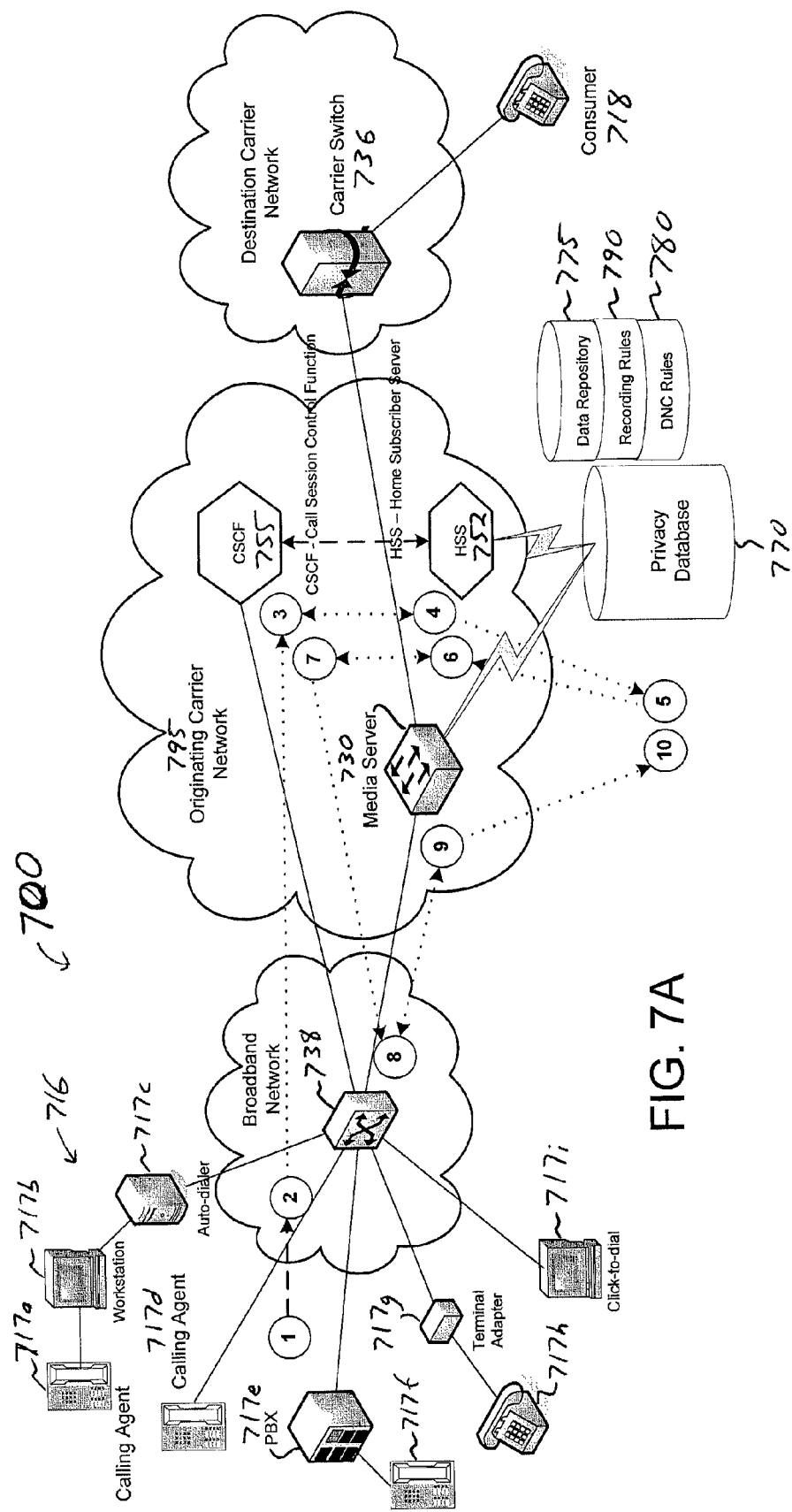
FIG. 7A is a flow diagram illustrating selective establishment and recording of an outbound call in an IP multimedia subsystem (IMS) network according to one embodiment.

FIG. 7A is a flow diagram illustrating selective establishment and recording of a call in an IP multimedia subsystem (IMS) network 700 according to one embodiment. The network 700 may include features and components as described above with reference to FIG. 1, and may operate in a manner comparable to the network 200 described above with reference to FIG. 2A. The network 700 includes an origin terminal 716, which may include one or more of a number of networked devices and configurations, such as a land-line telephone 717*a* connected to a computer workstation 717*b* and using an automated or predictive dialer 717; a land-line telephone 717*d*; a land-line telephone 717*f* connected to a PBX 717*e*; a telephone 717*h* connected to a network terminal adapter 717*g*; and a voice-over-IP (VoIP) click-to-dial computer interface 717*i*.

The origin terminal 716 connects to an originating carrier network 795 via a router 738 of a broadband network. The broadband router 738 routes IMS related communications to a call service control function 755 (a configured SCF) for establishing a call, and, once a call is established, routes a trunk to a media server 730. The media server 730, in turn, routes the trunk to a second carrier switch 736 at a destination carrier network, the second switch 736 being connected to a destination terminal 718. Alternatively, the media server 730 may be communicatively coupled to an additional switch (not shown), where the additional switch routes the trunk to the second carrier switch 736. The network 700, through implementation of a Privacy database 770 including a data repository 775, recording rules 790 and DNC rules 780, provides a service to a subscriber at the origin for monitoring of calls and compliance with privacy and DNC regulations.

Under some circumstances, a call may not be initiated in a manner that allows the CSCF 755 to selectively establish the call. For example, a calling agent may not be "on network," meaning that the origin terminal 716 may be establishing an outbound call through one or more networks outside of the expected originating carrier network 795. As a result, the CSCF 755 may not receive the call request, and the media server 730 may not be configured to record the call, contrary to an indication by the Privacy database 770. Alternatively, the calling agent may connect to the network and service using a carrier identification code (CIC). Although this connection may enable selective establishment and recording of a call, the consumer 718 may receive the "caller ID" of the calling agent's terminal.

An outbound call circumventing the originating carrier network 795 may also affect subsequent inbound calls. For example, a consumer 718 receiving an "off network" call may view the telephone number of the caller's terminal through a "caller ID" display or other device. Thus, if the customer 718 returns the agent's call by dialing the displayed telephone number, then the resulting inbound call may also circumvent the originating carrier network 795, thereby preventing the media server 730 from recording the inbound call.

Under other circumstances, a carrier network associated with the customer 718 may initiate and establish a call with a calling agent at a terminal 716 "on network" (i.e., coupled to the carrier network 795) in a manner that prevents the media server 730 from recording the call. This may occur, for example, when the consumer's network operates independent from the carrier network 795, and establishes a voice trunk to a carrier switch of the carrier network 795 in a manner that does not give sufficient notice to the CSCF 755 to initiate a recording of the call.

Embodiments described below, with reference to FIGS. 7A-B, ensure selective establishment and recording of a call in view of the aforementioned configurations. The network 700 may operate in a manner comparable to the network 200 described above with reference to FIG. 2A, with the addition of providing an "intervening number" as a caller ID to the consumer 718. This "intervening number," rather than being associated with the origin terminal 716, may be associated with the media server 730 or another component within the carrier network 795. As a result, the consumer 718 may utilize this intervening number when returning a call to the calling agent, routing the call first to the media server 730 and ensuring that a recording of the call can be conducted. An example of such an inbound call is described below with reference to FIG. 7B.

A process for providing the network service in an outbound call is described below, with reference to the numerals shown in FIG. 7A.

1) A calling agent at the origin terminal 716 (connected via a service-subscribed line) dials a number corresponding to the destination 718. If the origin terminal 716 is located at a different carrier network (not shown), or the calling agent is not a subscriber to the service, the agent may access the originating network 795 remotely. For example, the calling agent may enter a Carrier Access Code (CAC) to direct the switch to place the call on the appropriate network.

2) The call is held at the broadband switch 738 while the switch 738 generates a call origination request to the call session control function (CSCF) 755 for the subscribed line. When the subscribed line sits behind a PBX 717*e*, the PBX 717*e* provides the identification of the subscribed line (e.g. ANI or Calling Party Number) on the PRI D channel so that the switch 735 can generate a call origination query to the CSCF 755 for the appropriate line. The calling party and ANI provided by the PBX may be different numbers. In such a case, the query may be based on calling party number. In alternative embodiments employing a mobile phone at the origin, a Mobile Station ID (MSID) number is the identifier for mobile numbers.

3) The CSCF 755 receives the call origination request and requests data from the home subscriber server (HSS) 752 application servers for subscriber information. The query may identify both the origin and terminating (destination) numbers.

4) The HSS 752 receives the subscriber information request and forwards the request to the Privacy database 770.

5) The Privacy database 770 receives information including both the origination and terminating numbers corresponding to the request.

6) The Privacy database 770 process the request and returns an "allow" or "not-allow" call message to the HSS 752 along with indication on whether call recording is to be performed. The Privacy database 770 further provides the intervening number to be displayed to the consumer 718 in place of the calling agent's originating number at the origin terminal 716.

7) The call routing results are sent to the CSCF 755, the CSCF 755 then determining how to route the call and the appropriate media server to bridge onto the call. The CSCF 755 further instructs the media server 730 to display the intervening number as the "caller ID" displayed to the consumer 718.

8) The broadband switch 738 routes the call to the destination carrier switch 736 and bridges onto the call a media server 730 for call recording or playback of automated messages.

9-10) Once the call is completed, and the contents of the call have been recorded, the media server 730 forwards the file containing the contents of the call to the Privacy database 770 along with identifying information about the call. The contents of the call may be stored to the data repository.

If the call is not allowed (as indicated by a "not-allow" message from the Privacy database 770), the media server 730 receives the call and plays an announcement back to the origin terminal 716 agent that the call is not permitted. The announcement may provide information to an end user regarding compliance with privacy or DNC regulations.

If the call is allowed (as indicated by an "allow" message from the Privacy database 770), the CSCF 755 instructs the switch 738 to establish the call to the terminating number, connecting the call to the destination terminal 718. The call may be routed through the media server 730 (or through a switch (not shown) communicatively coupled to the media server 730) to perform additional functions such as call monitoring and call disposition. Alternatively, the call may be routed to bypass the media server 730. When a call is terminated (i.e. the parties hang up) a message containing information about the call is generated by the switch 738 or by the media server 730. This message may be processed at a later time by the carrier network, and those messages associated with the network DNC service are forwarded to Privacy database 770. These messages provide call information such as whether or not the call was answered and the length of the call. Additional functions, such as call disposition and monitoring, may also be performed in the network 700 and are described below with reference to FIGS. 5A-C. In some embodiments such as IP Multimedia Subsystem (IMS) networks, these messages may be referred to as web services or Application Programming Interface (API) calls. In other embodiments such as SS7 networks, these messages may be referred to as Call Detail Records (CDRs).

Figure 7B:
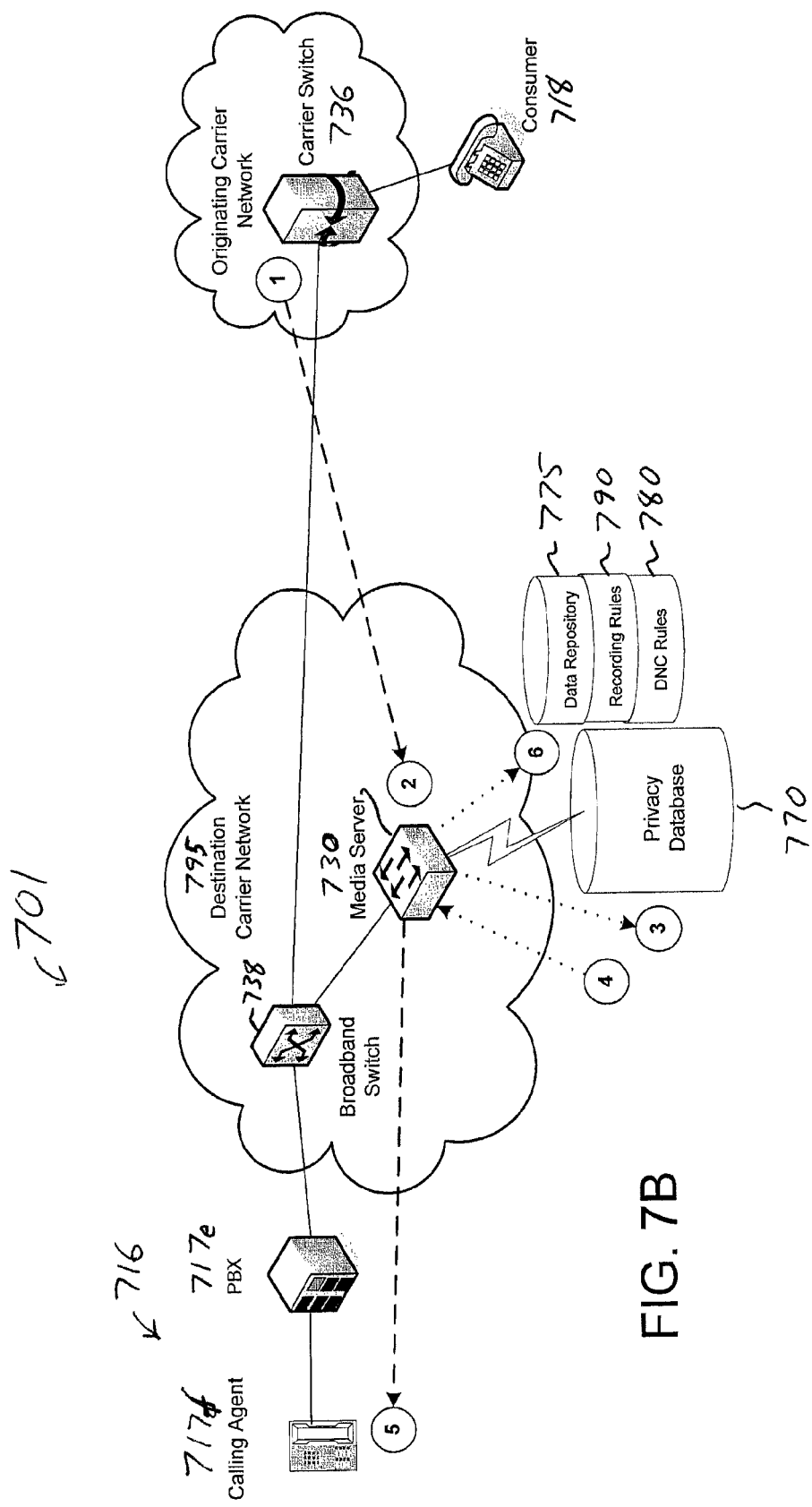
FIG. 7B is a flow diagram illustrating selective establishment and recording of an inbound call in an IP multimedia subsystem (IMS) network according to one embodiment.

FIG. 7B is a flow diagram illustrating selective establishment and recording of an inbound call in an IP multimedia subsystem (IMS) network 701 according to one embodiment. The network 701 may include features and components as described above with reference to FIG. 7A, and may perform an operation for recording an outbound call as described above with reference to FIG. 7A. In particular, an inbound call according to FIG. 7A may be conducted following an outbound call according to FIG. 7A. As a result of conducting a call as shown in FIG. 7A, a consumer 718 obtains the intervening number associated with the origin terminal 716 (via a "caller-ID" or other device). If the call is to be recorded, as indicated by the Privacy database 770, the media server 530 conducts a recording of the call. A process for providing the network DNC service with inbound call recording is described below, with reference to the numerals shown in FIG. 7B.

1) The consumer 718 places a call to a calling agent 717f at the origin terminal 716 by dialing the "intervening number," a number that is configured to terminate on the media server 730. Alternatively, the intervening number may terminate at another component (not shown) that is communicatively coupled to the media server 730.

2) The call is routed to the media server 730 to establish the first leg of the call.

3) The media server 730 queries the Privacy database 770 supplying the "intervening number" to identify the "destination number" of the agent (the number terminating at the origin terminal 716) and to determine if the call should be recorded.

4) The Privacy database 770 processes the request and returns the "destination number" to the media server 730, along with an indication of whether the call is to be recorded.

5) The media server 730 completes the second leg of the call to the origin terminal 716, and proceeds to record the call as well as monitor for any call disposition according to the parameters at the Privacy database 770.

6) Once the call is completed and the entire contents of the call have been recorded, a file containing the contents of the call may be forwarded to the Privacy database 770, along with identifying information about the call.

It should be understood that the block diagram of FIG. 1 and the flow diagrams of FIGS. 2-7B are examples that can include more or fewer components, be partitioned into subunits, or be implemented in different combinations. Moreover, the flow diagrams may be implemented in hardware, firmware, or software. If implemented in software, the software may be written in any software language suitable for use in networks and network devices as illustrated in FIG. 1. The software may be embodied on any form of non-transitory computer readable medium, such as RAM, ROM, or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. A system, having at least one processor, comprising:
 a privacy database configured to store call recording rules associated with a plurality of origins and destinations;
 a service control function (SCF) configured to selectively establish a call between an origin and a destination based on status and jurisdiction of at least one of the origin and destination indicated in the privacy database, the SCF further configured to provide parameters for the call based on the call recording rules, the SCF further configured to compare at least one of an origin ID and a destination ID against the privacy database to determine subscription status of at least one of the origin and the destination, the parameters being dependent on the comparison; and
 a server configured, responsive to the parameters, to selectively generate an audio recording of the call.

2. The system of claim 1, wherein the server is further configured to report an input to update the privacy database.

3. The system of claim 2, wherein the privacy database includes an indication of a telephone number to be displayed to a destination.

4. The system of claim 3, wherein the SCF, responsive to the indication, controls the server to convey the telephone number to the destination.

5. The system of claim 4, wherein the telephone number is conveyed to the destination at a caller ID display.

6. The system of claim 3, wherein the telephone number terminates at the server.

7. The system of claim 6, wherein the server is further configured, responsive to a call to the server via the telephone number, to establish an additional call to the origin.

8. The system of claim 1, wherein the SCF is configured to compare a destination ID against an associated jurisdiction indicated in the privacy database, the parameters being dependent on the comparison.

9. The system of claim 1, wherein the SCF is configured to compare an origin ID against an associated jurisdiction indicated in the privacy database, the parameters being dependent on the comparison.

10. The system of claim 1, wherein the SCF is configured to compare a destination ID and an origin ID against an associated jurisdiction indicated in the privacy database, the parameters being dependent on the comparison.

11. The system of claim 1, wherein the server is a component of the SCF.

12. The system of claim 1, wherein the server is responsive to a user-inputted command to initiate recording of the call and delivery of a recorded disclosure to the destination.

13. The system of claim 12, wherein the recording of the call corresponds to at least one of an electronic signature, an exemption to a do-not-call rule, a call recording, and consent to participate in a recorded call.

14. A system, having at least one processor, comprising:
a privacy database configured to store call recording rules associated with a plurality of origins and destinations;
a service control function (SCF) configured to selectively establish a call between an origin and a destination based on status and jurisdiction of at least one of the origin and destination indicated in the privacy database, the SCF further configured to provide parameters for the call based on the call recording rules; and
a server configured, responsive to the parameters, to selectively record the call;
wherein the server is further configured to report an input to update the privacy database;
wherein the privacy database includes an indication of a telephone number to be displayed to a destination;
wherein the telephone number terminates at the server;
wherein the server is further configured, responsive to a call to the server via the telephone number, to establish an additional call to the origin; and
wherein the server is further configured to query the privacy database using the telephone number to identify the origin and determine parameters for the additional call.

15. The system of claim 14, wherein the server is further configured to selectively record the additional call according to the parameters for the additional call.

16. The system of claim 14, wherein the SCF, responsive to the indication, controls the server to convey the telephone number to the destination.

17. The system of claim 16, wherein the telephone number is conveyed to the destination at a caller ID display.

18. A system, having at least one processor, comprising:
a privacy database configured to store call recording rules associated with a plurality of origins and destinations;
a service control function (SCF) configured to selectively establish a call between an origin and a destination based on status and jurisdiction of at least one of the origin and destination indicated in the privacy database, the SCF further configured to provide parameters for the call based on the call recording rules; and
a server configured, responsive to the parameters, to selectively generate an audio recording of the call;
wherein the SFC is configured to compare at least one of a destination ID and an origin ID against an associated jurisdiction indicated in the privacy database, the parameters being dependent on the comparison.

19. A system, having at least one processor, comprising:
a privacy database configured to store call recording rules associated with a plurality of origins and destinations;
a service control function (SCF) configured to selectively establish a call between an origin and a destination based on status and jurisdiction of at least one of the origin and destination indicated in the privacy database, the SCF further configured to provide parameters for the call based on the call recording rules; and a server configured, responsive to the parameters, to selectively generate an audio recording of the call;
wherein the server is further configured, responsive to the parameters, to selectively provide one or more recorded disclosures, before, during or after the call, to one or more parties to the call.

20. The system of claim 19, wherein the recorded disclosures are initiated by user-inputted commands entered at the origin or destination or both before, during or after the call.

* * * * *